United States Patent [19]

Gibney et al.

[11] Patent Number: 5,552,171
[45] Date of Patent: Sep. 3, 1996

[54] METHOD OF BEVERAGE BLENDING AND CARBONATION

[75] Inventors: Michael W. Gibney, Ingleside; Lawrence M. Lucas, Corpus Christi; Roy Culver, Jr., Ingleside, all of Tex.

[73] Assignee: Micro-Blend, Inc., Ingleside, Tex.

[21] Appl. No.: 486,783

[22] Filed: Jun. 7, 1995

Related U.S. Application Data

[60] Division of Ser. No. 180,404, Jan. 12, 1994, abandoned, and a continuation-in-part of Ser. No. 904,421, Jun. 26, 1992, Pat. No. 5,314,703, each is a continuation-in-part of Ser. No.798,824, Nov. 22, 1991, abandoned, which is a division of Ser. No. 482,363, Feb. 20, 1990, Pat. No. 5,068,116, which is a continuation-in-part of Ser. No. 416,813, Oct. 4, 1989, abandoned.

[51] Int. Cl.$^6$ ........................................................ A23L 2/00
[52] U.S. Cl. ........................... 426/231; 426/477; 426/590
[58] Field of Search ....................................... 426/231, 477, 426/590; 99/275, 323.2; 366/132, 152, 160; 137/101.19; 73/861.38

[56] References Cited

U.S. PATENT DOCUMENTS

| 2,724,581 | 11/1955 | Pahl et al. | 259/18 |
| 3,001,397 | 9/1961 | Leonard | 73/194 |

(List continued on next page.)

FOREIGN PATENT DOCUMENTS

WO83/02935  9/1983  WIPO .

OTHER PUBLICATIONS

Wilks, Jr., et al., "Internal Reflection Spectroscopy", *American Laboratory*, pp. 18–20 (Jun. 1980).

Wilks, Jr., "On–Line Brix Measurement by Infrared Absorption", Proceedings of the 24th Annual Short Course for the Food Industry of the Institute of Food Technologists, Florida Section (1984).

Maczka, W. J., "On–Line Analysis Aids Coke's Bottom Line", *Intech*, pp. 37–39 (Jan. 1989).

Sfiligoj, E., "Clean Sweep", *Beverage World International*, pp.49–50 (Apr. 1992).

"In the Flow—MICRO MOTION® Field Feedback", vol. 2, No. 5, pp. 2–6.

"Good Vibrations—Applications in Direct Mass Flow Measurement", No. 3 (Apr. 1988).

Young A. M., "Coriolis–Based Mass Flow Measurement", *Sensors*, pp. 6–10 (Dec. 1985).

"EXAC—Accurate Mass Flow Meters", product brochure (Mar. 1987).

"No mass flowmeter in the world can match the performance of *the EXAC Model 8300EX.*", product brochure and related materials (Apr. 1988, Dec. 1988 and May 1989).

"Beverage Control—Something that Finally makes sense", Micro–Blend, Inc. product brochure (1990).

"Technology for the brewing and soft drink industries" GEA Füllpack advertising brochure (Oct. 1990).

(List continued on next page.)

*Primary Examiner*—George Yeung
*Attorney, Agent, or Firm*—Seidel, Gonda, Lavorgna & Monaco, P.C.

[57] ABSTRACT

An apparatus is provided for improving quality and increasing syrup yield within a beverage blending system. The apparatus and the associated method are adaptable to existing proportioning and blending systems or the appropriate control and measurement equipment may be installed alone to provide a highly accurate control of the blend. This control is a function of the mass flow of at least one of the components input to the proportioner. From this mass flow determination an adjusted volumetric flow value for the component(s) is determined. The ratio of the volumetric flow of the water to the syrup is used to determine a signal to control the proportional blending. Adjustment of the blend ratio is made by comparing the calculated ratio to the set beverage values. Control of the carbonation of the system is also incorporated as well as a device to fully saturate the $CO_2$ into the liquid flow.

13 Claims, 10 Drawing Sheets

5,552,171
Page 2

U.S. PATENT DOCUMENTS

| | | | |
|---|---|---|---|
| 3,237,808 | 3/1966 | Witt et al. | 222/64 |
| 3,260,504 | 10/1966 | Mojonnier et al. | 251/357 |
| 3,272,020 | 9/1966 | Witt et al. | 74/18.1 |
| 3,583,415 | 6/1971 | Smith | 137/3 |
| 3,780,198 | 12/1973 | Pahl et al. | 426/477 |
| 3,799,402 | 3/1974 | Meister et al. | 222/129.2 |
| 3,991,911 | 11/1976 | Shannon et al. | 222/25 |
| 4,036,062 | 7/1977 | Cruzan | 73/422 CC |
| 4,186,769 | 2/1980 | Buyce | 137/566 |
| 4,252,253 | 2/1981 | Shannon | 222/25 |
| 4,341,107 | 7/1982 | Blair et al. | 73/195 |
| 4,350,503 | 9/1982 | Skoli et al. | 55/165 |
| 4,353,482 | 10/1982 | Tomlinson et al. | 222/1 |
| 4,397,189 | 8/1983 | Johnson et al. | 73/861 |
| 4,403,323 | 9/1983 | Nicolai | 372/40 |
| 4,433,701 | 2/1984 | Cox et al. | 137/101.19 |
| 4,440,314 | 4/1984 | Vetter et al. | 222/39 |
| 4,470,294 | 9/1984 | Hamel | 73/32 A |
| 4,557,799 | 12/1985 | Nelson et al. | 99/486 |
| 4,580,699 | 4/1986 | Black et al. | 222/64 |
| 4,597,506 | 4/1986 | Eglise et al. | 221/6 |
| 4,607,342 | 8/1986 | Seiden et al. | 364/558 |
| 4,621,927 | 11/1986 | Hiroi | 366/132 |
| 4,658,988 | 4/1987 | Hassell | 222/129.1 |
| 4,689,989 | 9/1987 | Aslesen et al. | 73/61.1 R |
| 4,718,443 | 1/1988 | Adney et al. | 137/8 |
| 4,729,243 | 3/1988 | Friedland et al. | 73/861.38 |
| 4,732,582 | 3/1988 | Mojonnier | 55/165 |
| 4,737,037 | 4/1988 | Mojonnier | 366/152 |
| 4,753,370 | 6/1988 | Rudick | 222/105 |
| 4,762,251 | 8/1988 | Berger | 222/49 |
| 4,762,261 | 8/1988 | Hawley et al. | 227/66 |
| 4,773,257 | 9/1988 | Aslesen et al. | 73/61.1 R |
| 4,795,061 | 1/1989 | Peckjian | 222/66 |
| 4,801,471 | 1/1989 | Mojonnier | 426/590 |
| 4,838,295 | 6/1989 | Smith et al. | 137/9 |
| 4,842,005 | 6/1989 | Hope et al. | 137/101.19 |
| 4,857,355 | 8/1989 | Gregg | 426/590 |
| 5,068,116 | 11/1991 | Gibney et al. | 426/231 |
| 5,143,257 | 9/1992 | Austin et al. | 222/57 |
| 5,190,075 | 3/1993 | Tentler et al. | 137/501 |

OTHER PUBLICATIONS

"The Science of Soft Drink Beverage Stability for High Temperature High Speed Filling". AMBEC advertising brochure (undated).

Culver, R., "Proportioner Pleases Pepsi", *Beverage World* (Jul. 1990).

Bush, P., "Illuminating a 'black art'", *Prepared Foods*, pp. 100–102 and 104 (Jun. 1990).

Sasaki, H., "Control Device for Discharge Rate of Paint", *Patent Abstracts of Japan*, vol. 13, No. 286 (88 C 613), JP–A–01 080 462 (Mar. 27, 1989).

Sasaki, H., "Control Device for Discharge Rate of Paint", *Patent Abstracts of Japan*, vol. 13, No. 286 (88 C 613), JP–A–01 080 463 (Mar. 27, 1989).

Sasaki, H., "Control Device for Discharge Rate of Paint", *Patent Abstracts of Japan*, vol. 13, No. 286 (88 C 613), JP–A–01 080 464 (Mar. 27, 1989).

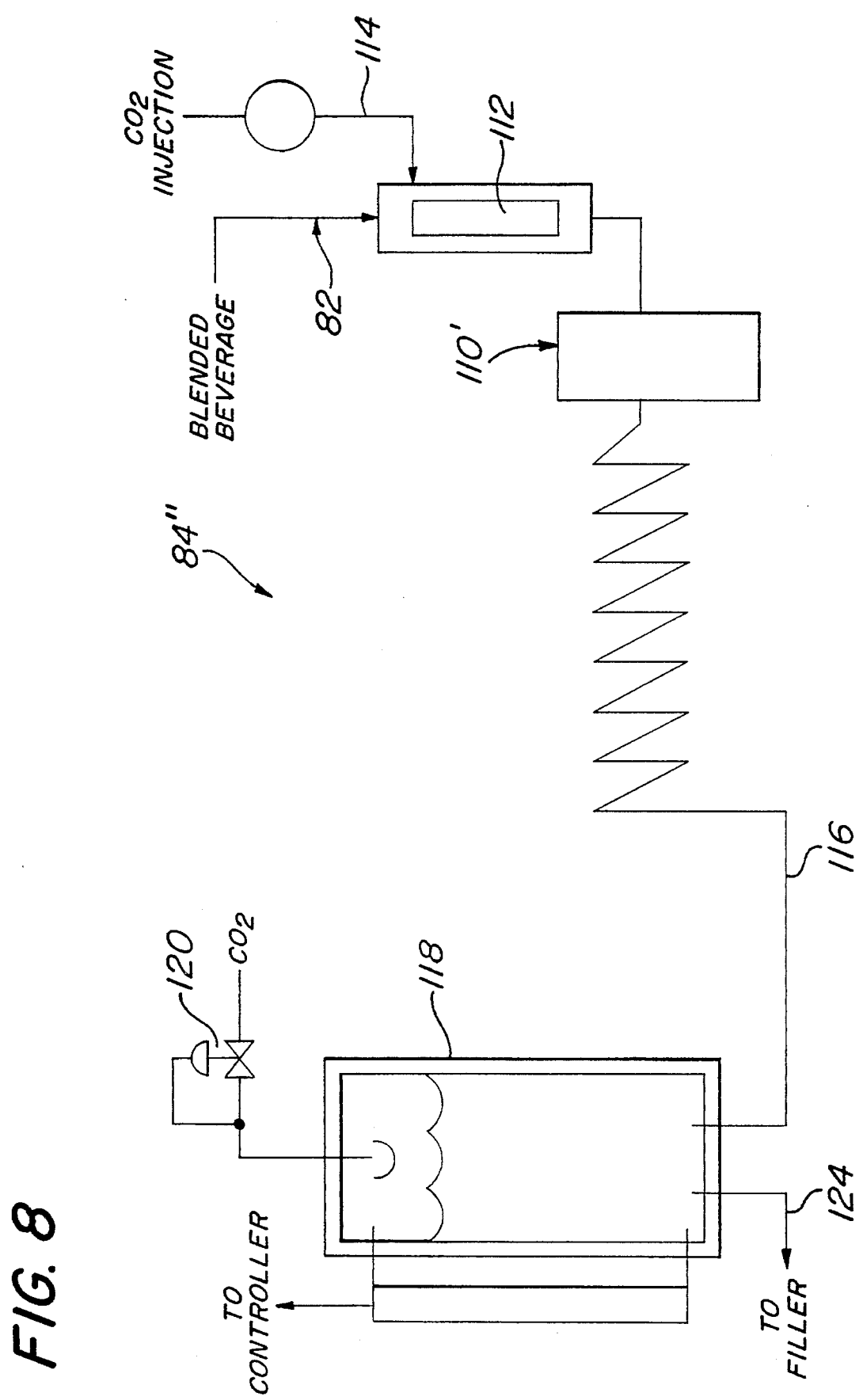

METHOD OF BEVERAGE BLENDING AND CARBONATION

This is a division of Application Ser. No. 180,404, filed Jan. 12, 1994, now abandoned, which is a continuation-in-part of Application Ser. No. 07/798,824, filed Nov. 22, 1991, now abandoned, which is a division of Application Ser. No. 07/482,363, filed Feb. 20, 1990, now U.S. Pat. No. 5,068,116, U.S. Pat. No. 5,068,116, which is a continuation-in-part of Application Ser. No. 07/416,813, filed Oct. 4, 1989, now abandoned. This is also a continuation-in-part of Application Ser. No. 07/904,421, filed Jun. 26, 1992, now U.S. Pat. No. 5,314,703, which is a continuation-in-part of Application Ser. No. 07/798,824, filed Nov. 22, 1991, now abandoned as referred to above. The above referenced patents and applications are herein incorporated by reference.

FIELD OF THE INVENTION

The present invention relates to an apparatus for improving quality and increasing syrup yields within a beverage blending system. In particular, the present invention relates to an apparatus for and its associated method of controlling the proportional blending of two or more components of a beverage by means of the mass flow of at least one of the components. The present invention also relates to the measurement and control of the carbonation process in the blending of a beverage.

BACKGROUND OF THE INVENTION

The preparation of beverages, particularly carbonated beverages, includes the mixture or blending in exact proportion of a flavor syrup with water. The proportion standards for a particular beverage are typically set by the owner of the syrup recipe and the associated trademarks associated with the beverage. These proportion standards are a fixed operational requirement for the bottler who is a licensee of the recipe owner.

There are a number of blending and proportioning systems found in the prior art. However, these prior art devices do not adjust the proportioning process to account for changing conditions as contemplated by present invention. Typically, the determination of whether the blended beverage conforms to the preset proportion standards is made after the beverage has been prepared by a downstream analyzer system or by lab analysis. If it is found that the already blended beverage does not fall within the preset standards, the batch is disposed at substantial cost to the bottler.

SUMMARY OF THE INVENTION

The present invention is a method and apparatus for controlling the proportional blending of beverage components as a function of the mass flow of at least one of the components. The present invention preferably includes Coriolis mass flow meters within both the syrup input line and the water input line within a blending system. The volumetric flow of the syrup (and preferably also for the water input) is determined from the mass flow reading of the Coriolis mass flow meter(s). The proportion of the water and syrup within the blend is calculated as function of the mass flow signal from the Coriolis meter(s). This calculated proportion value is compared to the fixed standard for the particular beverage or from an actual density determination of the fluids. From these calculations a result can be calculated in the same units as the fixed or calculated drink standard. Adjustment of the proportional blending is automatically made as function of these calculated and fixed values and related comparisons. Furthermore, an overall efficiency of the blending system may be determined.

A further aspect of the present invention is the carbonation of a blended beverage by controlling the contact time and pressure of the $CO_2$ with the beverage to cause the full saturation of $CO_2$ into the liquid.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 3, 3A and 3B show a flow diagram of the method for adjusting the proportional blending of a beverage in accordance with the present invention.

FIG. 8 shows an alternate form of a carbonator for use with the blending apparatus as contemplated by the present invention.

DETAILED DESCRIPTION OF THE DRAWINGS

Figure 1:
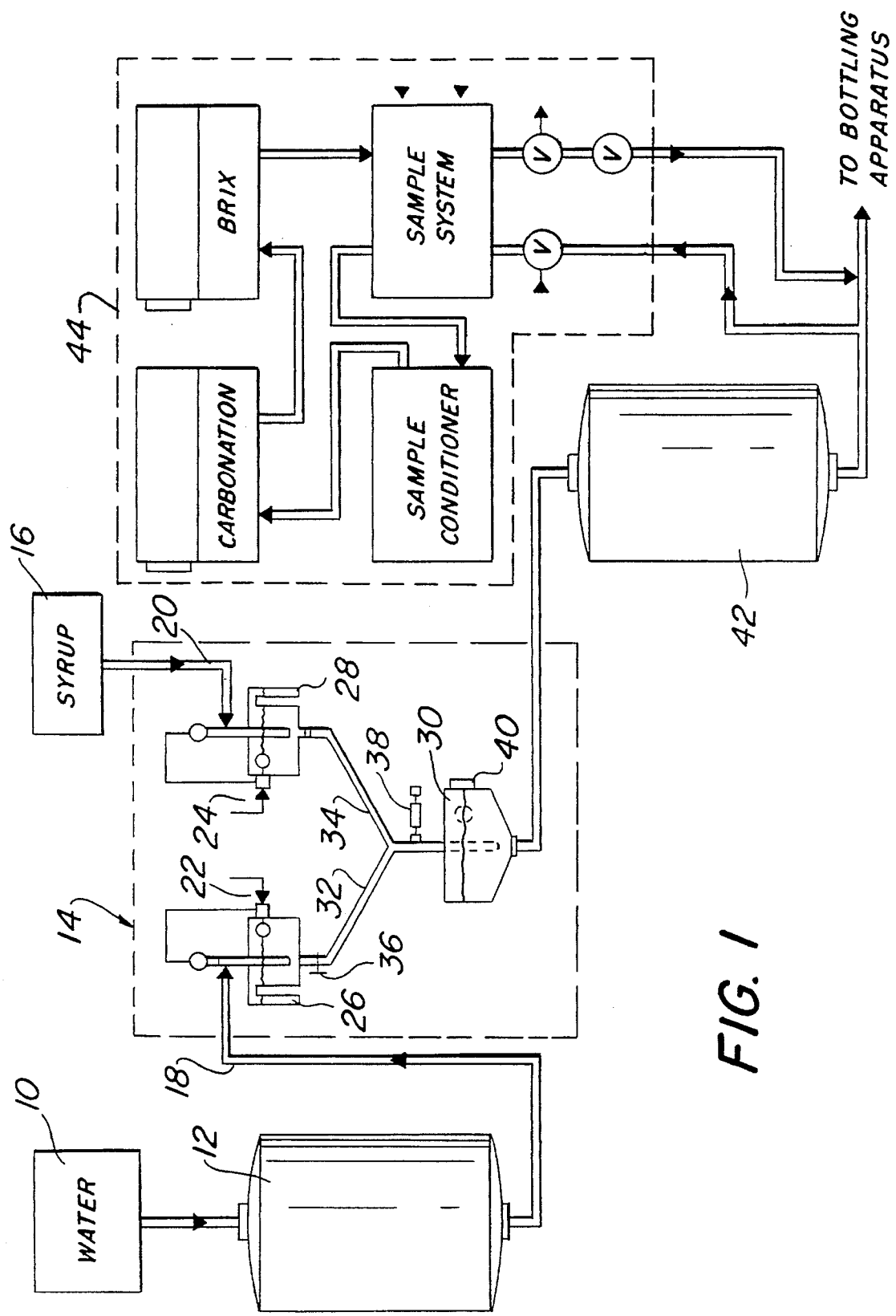
FIG. 1 shows a typical carbonated beverage blending and proportioning system including a downstream system analyzer.

In the figures where like numerals indicate like elements, there is shown in FIG. 1 a typical blending and proportioning system including a proportion analyzer at the discharge end. For purposes of the present invention this typical blending system need not be described in complete detail. Reference is hereby made to U.S. Pat. No. 4,801,471 to Mojonnier which describes a blending and proportioning system similar to those typically found in existing bottling plants. This Mojonnier patent is herein incorporated by reference.

The blending and portioning system of FIG. 1 includes a water input 10 which feeds a cooler 12. The cooler 12 feeds one portion of a proportioner 14. A syrup supply 16 feeds a separate portion of the proportioner 14. Filtered water from inlet 10 or syrup from supply 16 may pass through scrubbing units (not shown) or other apparatus as desired prior to input into proportioner 14. The input flow into the proportioner 14 from both the water line 18 and syrup line 20 is controlled by means of valves 22 and 24, respectively. Valves 22, 24 receive control signals from floating control members within the storage tanks 26 and 28 of the proportioner 14. These float valves may be similar to those shown and described in U.S. Pat. No. 3,272,020 to Witt et al. or U.S. Pat. No. 4,737,037 to Mojonnier. These patents are herein incorporated by reference.

Storage tanks 26 and 28 feed lines 32, 34, respectively, which exhaust into blending tank 30. Water line 32 into tank 30 includes a micrometer or similar type control valve 36. Valve 36 is used to make minute adjustments in the relative proportion of the water flowing into blending tank 30. Existing proportioner systems may typically include a valve similar to that shown in U.S. Pat. No. 3,237,808 to Witt et al. This Witt patent is herein incorporated by reference. Syrup line 34 may also include a control valve (not shown). However, due to the large proportion of water in a typical beverage, as compared to the syrup, minute control of the relative proportion of the components is more easily accomplished by adjustment at the water input. A total flow control valve 38 is also provided at the inlet to blending tank 30.

Blending tank 30 includes a float member 40 similar to that used along with valves 22 and 24. The signals from the float member 40 may be used to control the downstream flow of the blended beverage. The blended beverage from blending tank 30 is input into a carbonator 42. After carbonation, the beverage flow is directed towards a bottling apparatus (not shown).

The actual proportion of syrup and water within the blended beverage is determined by a downstream beverage analyzer 44. The analyzer 44 takes samples from the flow into the bottling apparatus. The samples are used to determine the accuracy of the blend as performed by the proportioner 14 and compare it to the fixed standards. If an on-line analyzer 44 is not provided, periodically samples are manually withdrawn from the flow and lab analysis is conducted to determine the proportion result.

Typically, sugar based beverages are analyzed by making a brix determination of the sugar within the overall blend. In the case of diet soda, the analyzer typically uses a titrated acidity determination. Methods of analyzing the beverage include internal reflection spectroscopy and infrared absorption.

Upon a finding that the blended beverage is outside of the standards set by the recipe owner, adjustment of the proportioning is made at valve 36 or at some other position within the system. Analyzer 44 may also serve to control the blend. Such an analyzer/controller is manufactured by the DuPont Corporation and is sold under the designation "DuPont Colormeter". This DuPont system includes an external water valve which inputs additional water into the flow at the position of the analyzer. The system compensates for errors of the proportional blending by operating the proportioner on the "high" or rich end of the blending standards. The addition of water downstream of the proportioner adjusts the proportion of the blend. However, if the analyzer fails to adjust the beverage into the proper proportion, the product will be outside of the fixed standards. This may occur, if the beverage blend moves into the "low" range. In this situation manual micrometer control must be made to realign the proportion into the desired range. The portion of the batch prepared outside of the fixed standards must then be disposed of prior to continuation of the blending and bottling process.

Figure 2:
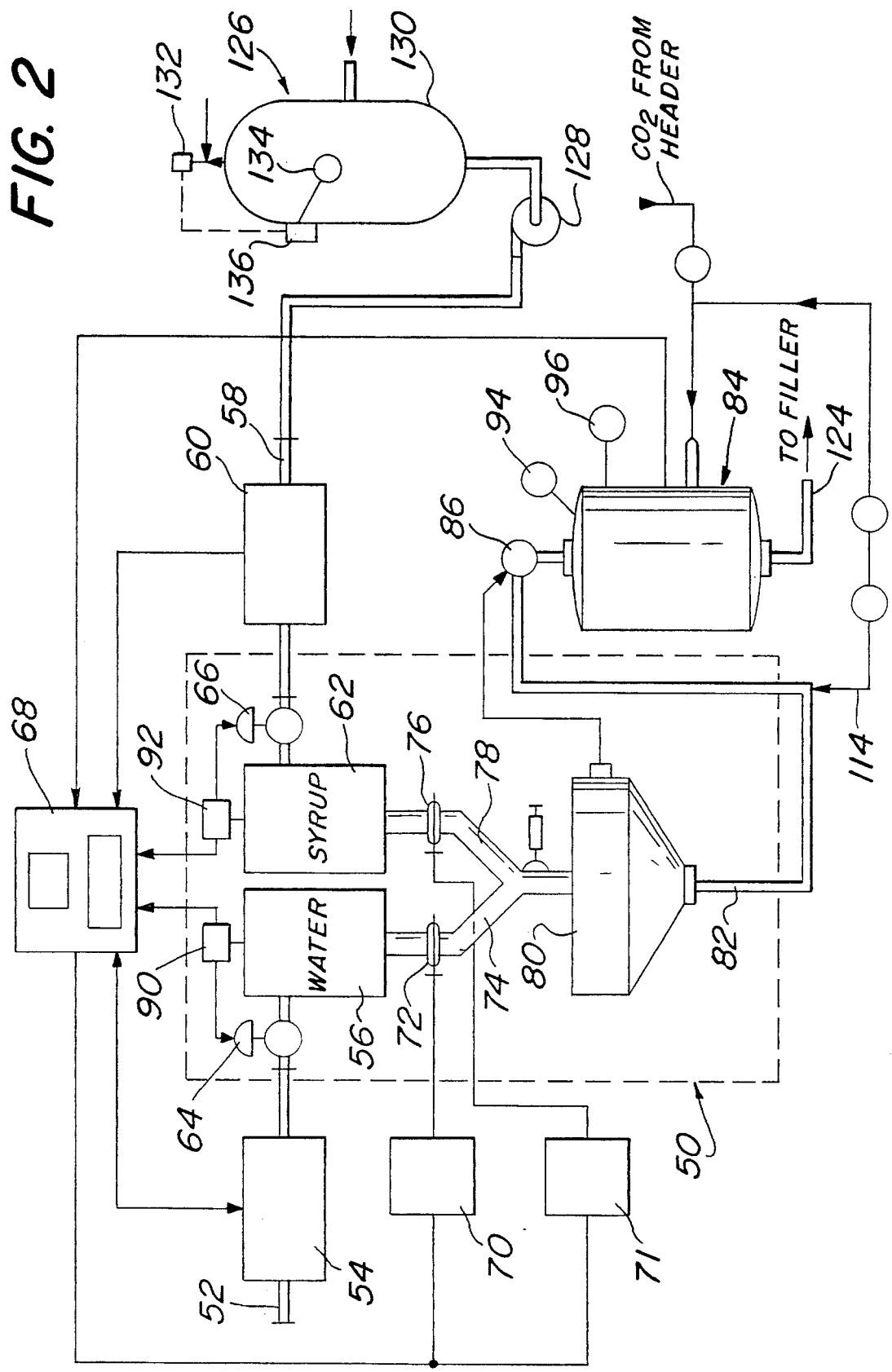
FIG. 2 shows a preferred beverage blending and proportioning apparatus in accordance with the present invention.
Figure 3:
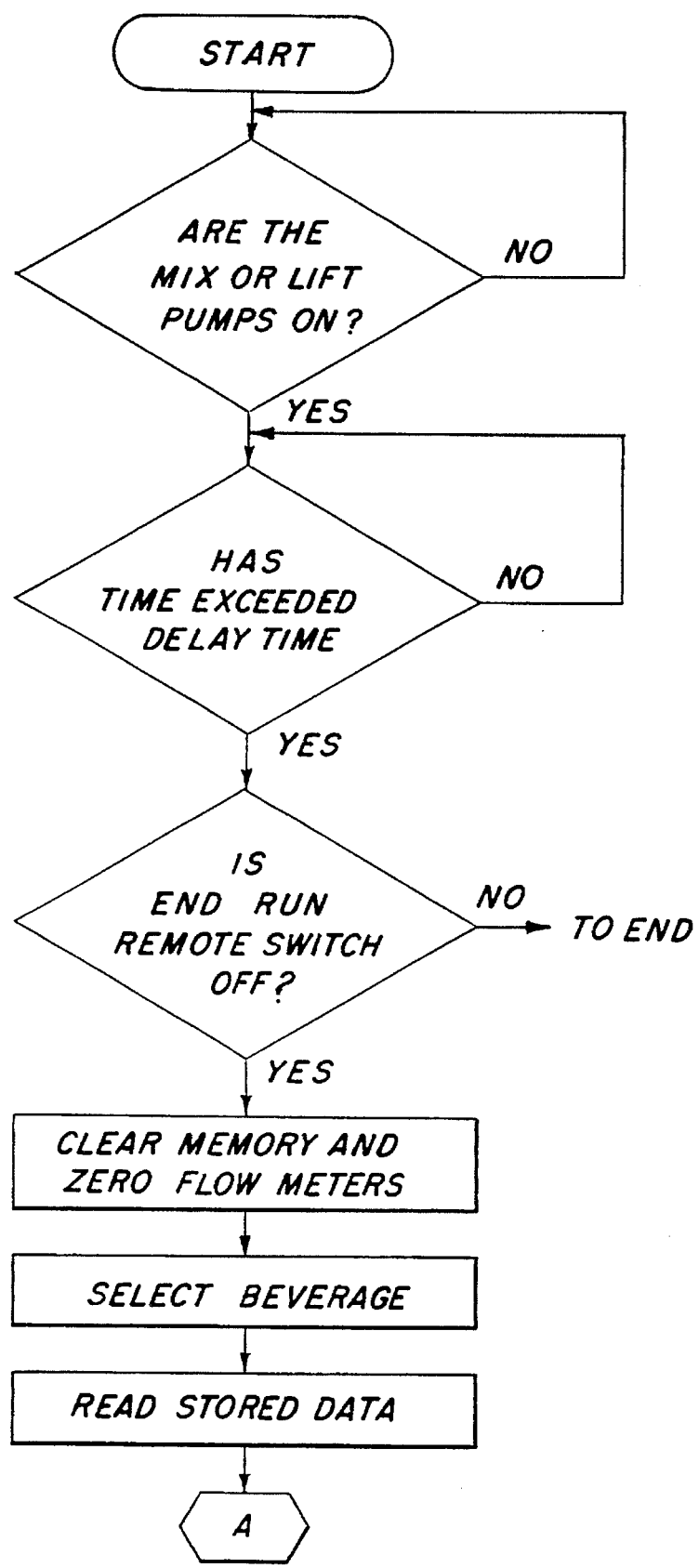
Figure 3:
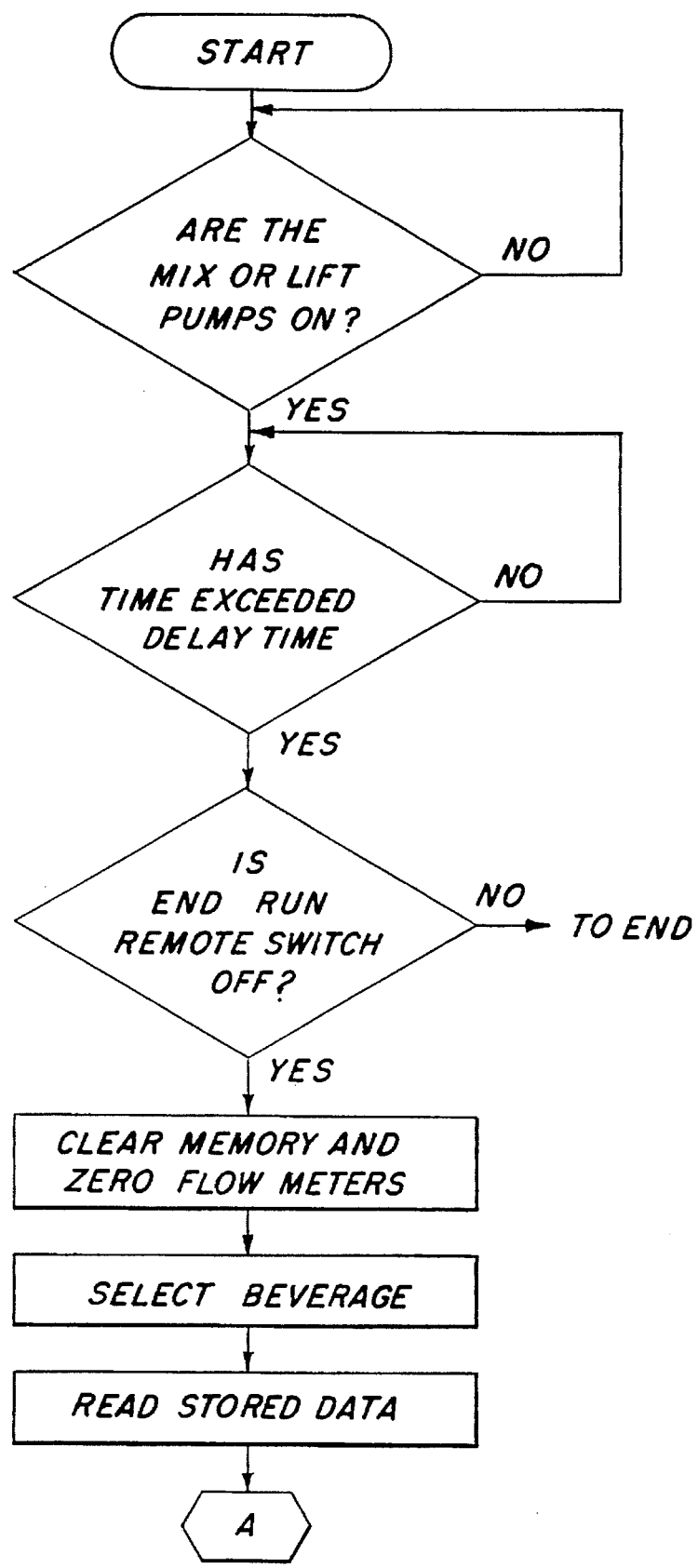
Figure 3B:
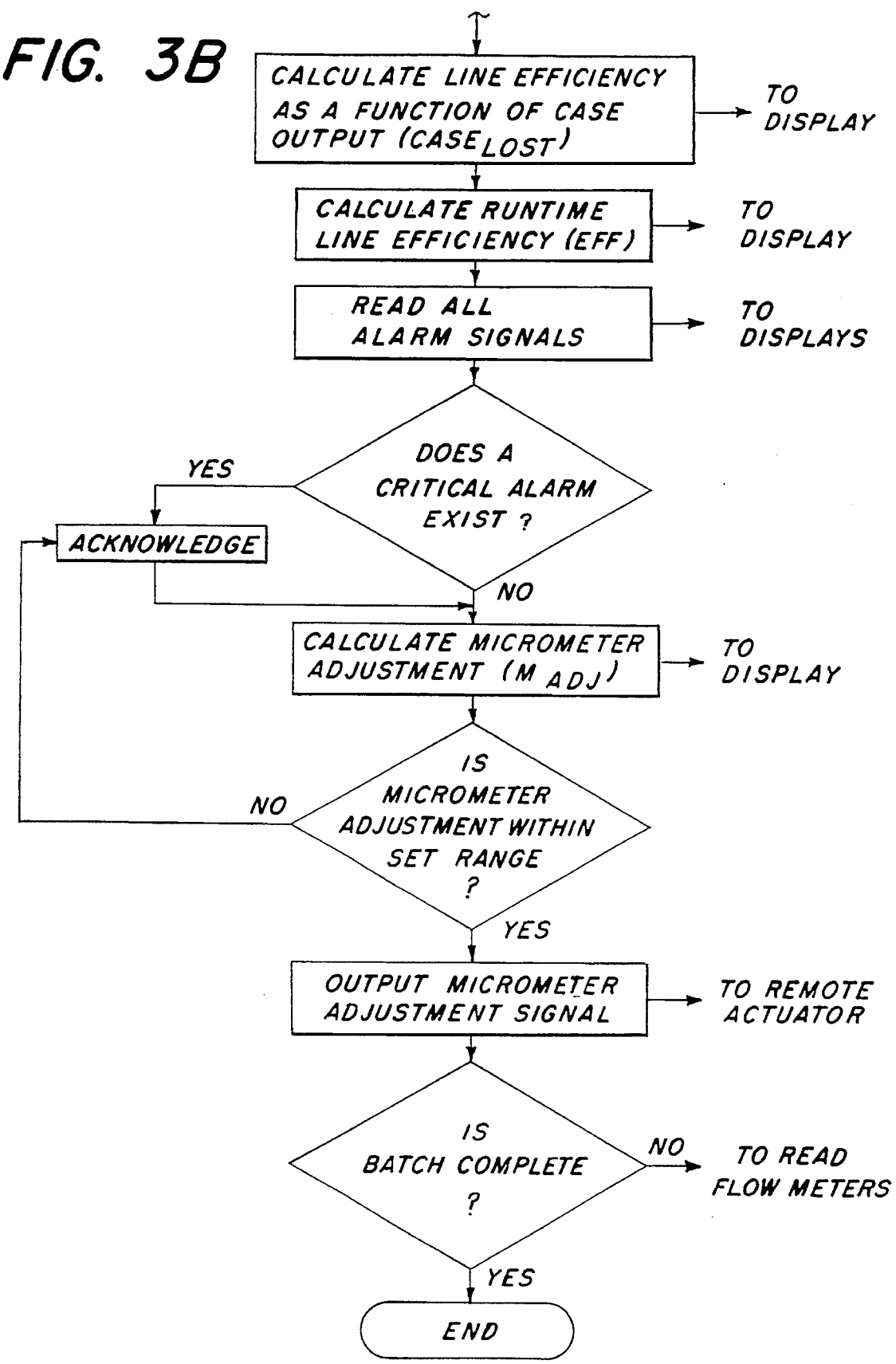

In FIG. 2 there is shown a beverage blending and proportioning apparatus in accordance with the present invention. This apparatus generally includes a proportioner 50 similar to proportioner 14 shown in FIG. 1. At the water inlet 52 to proportioner 50 is positioned a flow meter 54 to determine the mass flow rate of the water input into the water storage tank 56. Similarly, at the syrup inlet 58, there is a second mass flow meter 60 which determines the mass flow rate of the syrup input into the syrup storage tank 62 of the proportioner 50. Flow meters 54 and 60 are preferably of the type known as a Coriolis mass flow meter. Coriolis-type mass flow meters are preferred because of their high accuracy in determining the mass flow rate and total mass flow of a fluid without reference to the temperature or viscosity of the fluid. The size and operational capabilities of meters 54, 60 will depend upon the flow rates into the proportioner 50 and the number of storage tanks therein. The flow meters as generally preferred for use with the present invention are those manufactured by ABB K-Flow of Millville, N.J.

At the inlet side of water storage tank 56 is a flow control valve 64. The inlet to syrup tank 62 includes a similar valve 66. These valves 64, 66 may be controlled by float sensors (not shown) within tanks 56 and 62, respectively. A valve 76 is positioned at the outlet 78 of the syrup tank 62. Valve 76 as illustrated is a micrometer control valve which permits fine adjustment of the flow through outlet leg 78 into the blending tank 80. Alternatively, valve 76 may be a fixed orifice or other type valve. A second micrometer control valve 72 is located at the outlet 74 of water storage tank 56. Outlets 74 and 78 feed blending tank 80. The outlet 82 of blending tank 80 feeds pump 86 which directs the flow into carbonator 84. It is contemplated that the pump 86, as shown, may also take the form of a valve or similar device for controlling flow. The carbonator 84 directs the flow into a bottling or container filling apparatus (not shown). A float control (not shown) within the blending tank 80 outputs a signal which may be utilized downstream of the proportioner 50 by pump 86 to control the overall flow rate.

The signals from the flow meters 54, 60 are fed to a controller 68. Signals from the carbonator 84 are also fed into controller 68. Controller 68 in turn sends a signal to electronic actuators 70 and 71. Actuator 71 is used to adjust valve 76 at the outlet 78 of syrup tank 62. Actuator 70 is used to adjust micrometer control valve 72 at the outlet 74 of water storage tank 56. The actuators 70, 71 control the throttling or shut off of the valves 72, 76, respectively, by a rotary motion based upon a remote control signal from controller 68. Actuators 70, 71 as contemplated by the present invention may take any form as desired, such as geared electronic actuator A300 manufactured by the Flow Control Division of Milton Roy Industries. Adaptation of the actuators 70, 71 to operate valves 72, 76, respectively, may require a yoke bracket (not shown) or the like to be fit between the torque output of the actuator and the rotational knob of the micrometer. Such adaptation is contemplated to be within the skill of the art.

Alternatively, valves 72 and 76 along with actuators 70 and 71 could be replaced by any other type controllable valve, such as a pneumatic or mechanical driven valve or pump, that can adjust the flow upon receipt of a control signal. An example of such a valve is manufactured by Cherry-Burrell Company of Delavan, Wis. A preferred valve would be designated as "sanitary", since such would be required by the beverage industry. Controller 68 may also be used to adjust the blending performed by variable speed pumps (not shown) at the outlet of the proportioner storage tanks. Such a system is shown in Pahl, et al., U.S. Pat. No. 2,728,581. This Pahl, et al., patent is herein incorporated by reference. The adaptation of the present invention to operate along with this Pahl type system is contemplated to be within the skill of the art. Each of these alternate devices could be used with the structures shown (FIG. 2) or as replacements for the proportioner device 50 in FIG. 2.

Controller 68 may operate under any of the following preferred methods (or combinations thereof) for adjusting the proportional blending of a beverage. FIGS. 3, 3A, 3B, 4, 5 and 6 show flow charts for the presently-contemplated preferred methods. As particularly shown in FIG. 3, at start-up, the controller 68 reviews certain controls within the system. First, the controller 68 determines whether or not the mix or lift pumps (not shown) within the system are operating. If the pumps are not operating, the control program will not continue. If the pumps are operating, the controller 68 proceeds to the next step. There is a initial period at start-up where the signals from the flow meters 56, 60 and from other elements in the system may be unstable. A time delay is input into the system to permit stability to be achieved prior to making the initial flow meter readings. Upon exceeding the delay time, controller 68 moves to the next step. The final preliminary step taken is to determine whether or not the end run or start/stop remote switch (not shown) has been actuated. This end run switch will prevent further operation of the control program at any time during the blending operation. Upon completing the start-up procedure, the totalizer values from the flow meters 54, 60 are zeroed to indicate the start of a new batch. Also, the memory of the previous batch calculations is cleared.

A proportioning and blending system is required at different times to produce many different types of beverages under different blending recipes. The appropriate fixed data related to a particular beverage to be blended must be identified to properly instruct the controller 68 during further operation. The particular beverage to be run through the system will be selected at start-up. This selection actuates the retrieval of data from stored memory for the particular beverage. Thereafter, the syrup and water flow meter signals are read and the batch is initiated.

Figure 4:
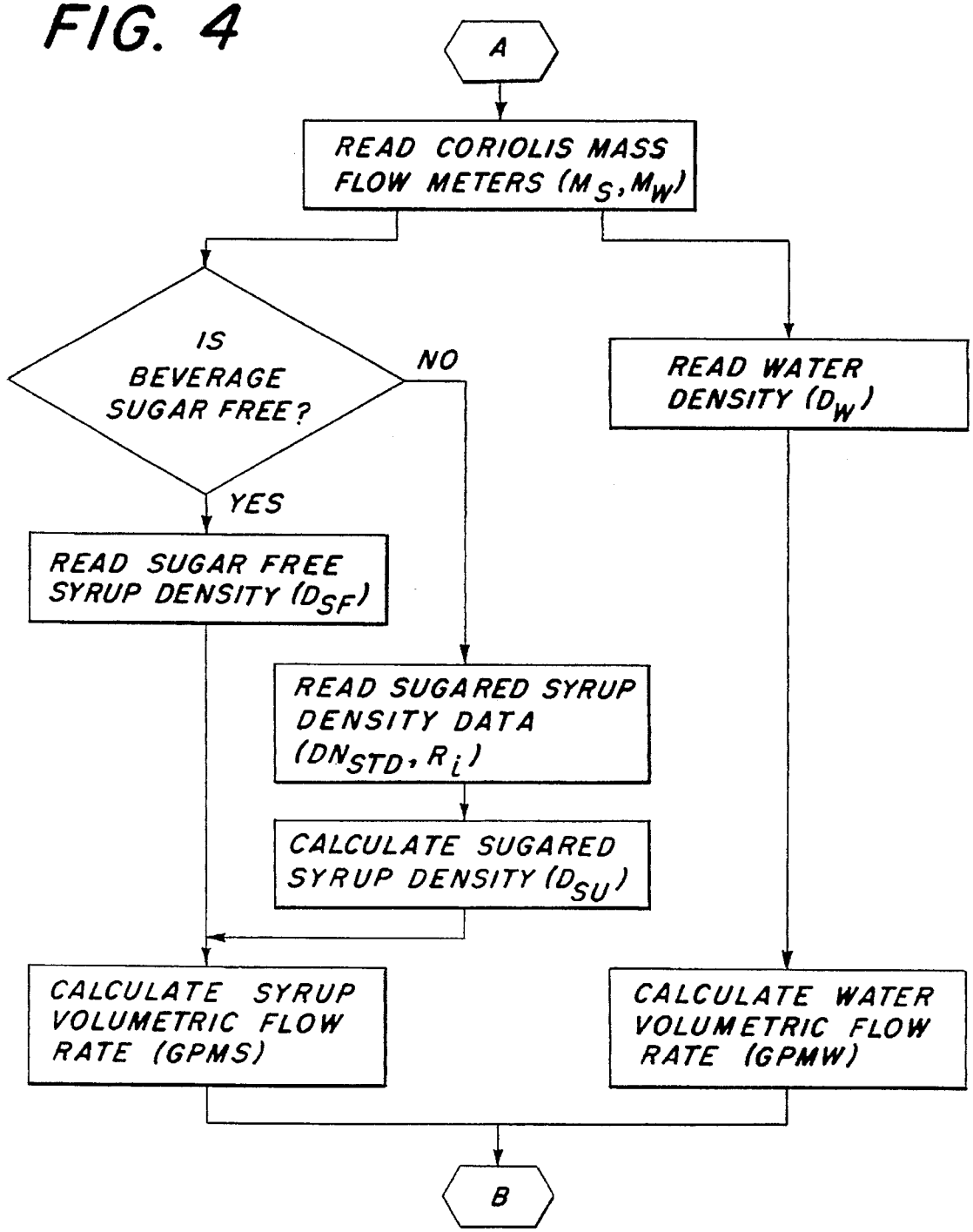
FIGS. 4, 5 and 6 show flow diagrams for alternative methods of calculating the volumetric flow rate of the water and syrup for use within the method shown in FIGS. 3, 3A and 3B.

In the method particularly shown in FIG. 4, the first determination made by the controller 68 during a batch run is whether or not the drink is a sugared drink or whether or not such is a diet or other non-sugar sweetened drink. This determination particularly relates to the density of the syrup.

The first calculation for a sugar-free syrup by the controller uses the mass flow signal from flow meter 60 to determine the volumetric flow rate of the syrup. The volumetric flow of the sugar-free syrup can be determined from the following equation:

$$GPMS_{sf}=M_s/(8.333 \bullet D_{sf}) \qquad (1)$$

($GPMS_{sf}$=gallons per minute of the sugar-free syrup; $M_s$=the mass flow rate of the syrup; and $D_{sf}$=the density of the sugar-free syrup.) Typically, the density of the sugar-free syrup can be estimated to be one, i.e. substantially the same as water at 20° C. However, controller 68 may be set to read a different density value for the sugar-free syrup ($D_{sf}$) as determined by the bottler or as set by the drink recipe owner.

The determination of the volumetric flow rate of a sugared syrup as a function of the mass flow is also a function of its density. This density value for a sugared syrup may be calculated as a function of published brix values. Curves providing this information are published by the National Bureau of Standards at Table No. 113. The brix value for a particular beverage syrup changes during the blending operation. Therefore, the density for each particular drink must be calculated. This density value is calculated by the resultant equation of a least squares regression on the published curves. This equation is as follows:

$$D_{su}=D_{su}+K_{(x+1)} \bullet (DN_{std} \bullet R_i)^x \qquad (2)$$

($D_{su}$=density of the sugared syrup; K=a constant corresponding to the least squares calculation; x=the coefficient value within the calculation; $DN_{std}$=the standard drink number for the resulting beverage being prepared; and $R_i$=the ideal ratio for mixing the particular syrup with water.) The calculation using this equation includes the following constant (K) values:

$K_{(1)}$=0.9987881
$K_{(2)}$=0.003715599
$K_{(3)}$=0.00002321195
$K_{(4)}$=-0.0000002270948
$K_{(5)}$=0.000000003156378
$K_{(6)}$=-0.00000000001398131

The series of calculations start at x=5 and $D_{su}=K_{(1)}$ with each subsequent calculation being made for x−1.

From this density calculation ($D_{su}$), the flow rate of the sugared syrup can be determined as a function of the mass flow signal from flow meter 60 by the following equation:

$$GPMS_{su}=M_s/(8.333 \bullet D_{su}) \qquad (3)$$

In the same manner the output of water flow meter 54 is used to calculate the volumetric flow rate of the water as a function of its mass flow. This volumetric flow rate is determined from the following equation:

$$GPMW=M_w/(8.333 \bullet D_w)$$

In this equation, the density of the water ($D_w$) is input from the meter 54. As an alternative, a fixed value for the density of the water at 20° C. is used (i.e., 0.998234).

The advantage of using Coriolis type mass flow meters as part of the present invention is due to the accuracy of the mass flow determination made therefrom. This mass flow determination is made without reference to the viscosity or temperature of the fluid. Thus, the volumetric determinations made by equations (1), (3) and (4) are essentially free of fluid temperature and viscosity considerations. Ultimately the accuracy of the blending control by the present invention is checked against laboratory analysis by the bottler. Further, calculations made by the controller 68 require lab analysis input, such as the standard drink number ($DN_{std}$). This data and the density values used to calculate the volumetric flow for the water and the syrup (sugar and sugar free) and other calculations within the system are made on the assumption that the fluid is at 20° C. Since the signal from the mass flow meter is not temperature dependent, this assumption provides accurate results. Since the temperature of the water may not vary significantly during normal operation, the fixed value for the water may be used. The calculation or determination of the volumetric flow of the water into the proportioner 50 may not be a limiting factor in the accuracy of final blend. Moreover, in many situations the use of a Coriolis-type mass flow meter on the water feed line 52 may be unnecessary.

Figure 5:
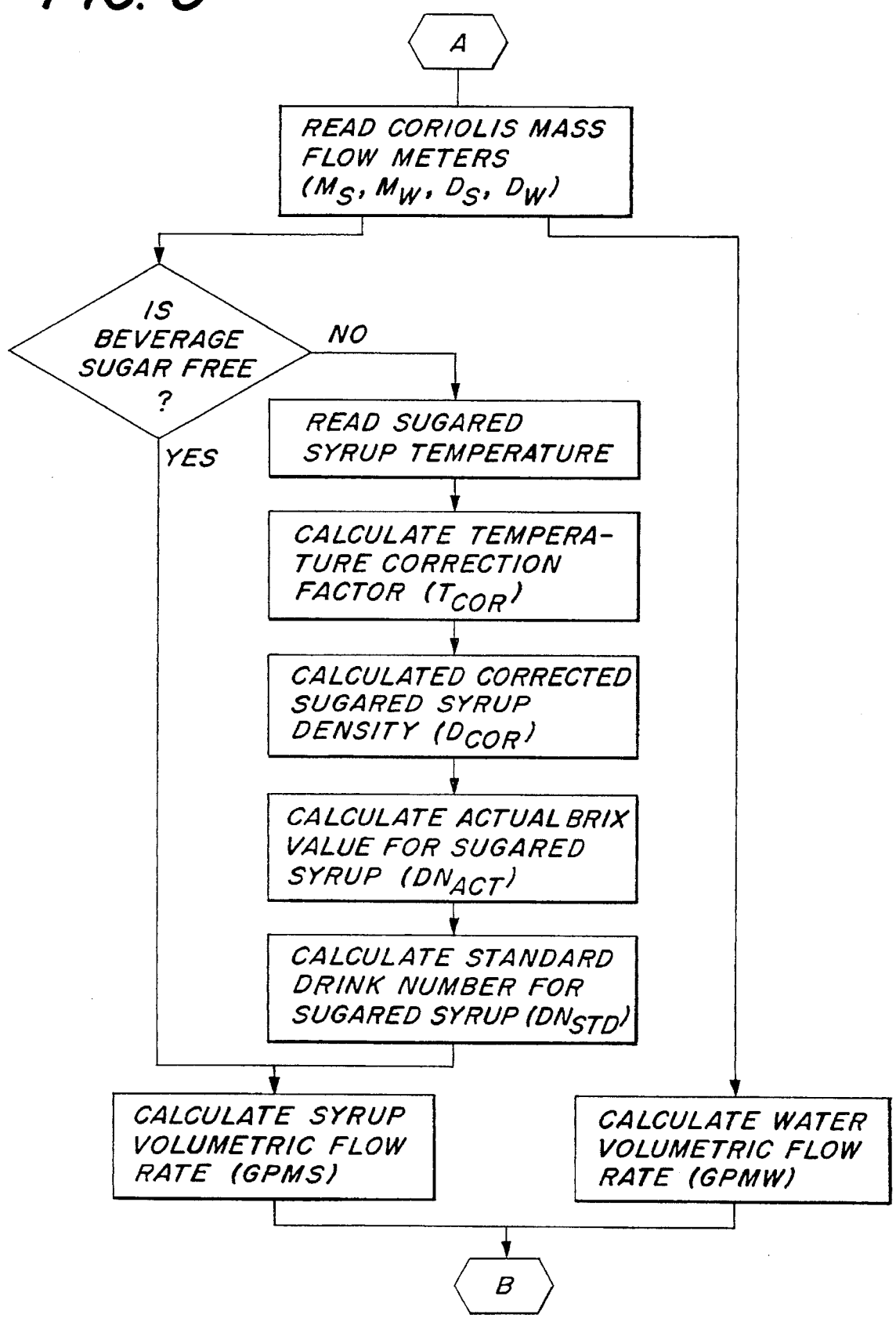

In the method particularly shown in FIG. 5, the calculation of the volumetric flow of the sugar-free syrup uses the mass flow signal from flow meter 60 as well as the density signal therefrom. Thus, the density of the sugar-free syrup ($D_{sf}$) in equation (1), above, is an actual value rather than an assigned value.

The determination of the volumetric flow rate of a sugared syrup as a function of the mass flow and density flow readings is somewhat more complicated than for the sugar free syrup calculation. This calculation generally involves inputting an actual drink number ($DN_{act}$) for the syrup into the control drink number ($DN_{std}$) of the beverage as found in equation (2). The temperature of the sugared syrup becomes a significant factor in determining of the drink number value. The variation in temperature in the sugar-free syrup is not considered significant for purposes of determining a volumetric flow. Thus, the measured density readings from the densitometer portion of the Coriolis meter requires correction to 20° C.

The temperature correction factor is calculated by the resulting equation of a least squares regression duplicating the curves at National Bureau of Standards Table No. 120. The resultant equation based upon this regression is as follows:

$$T_{cor} = T_{cor} + KT_{(xt+1)} \bullet D_s^{xt} \qquad (2a)$$

($T_{cor}$=temperature correction variable factor; KT=a constant corresponding to the least squares regression; xt=the coefficient value within the regression; and $D_s$=the measured density value from the flow meter 60.) The regression for this equation includes the following constant (KT) values:
$KT_{(1)}$=−0.004109494
$KT_{(2)}$=0.007006943
$KT_{(3)}$=−0.00194279
$KT_{(4)}$=0.001908077
$KT_{(5)}$=0.001467323
$KT_{(6)}$=−0.0002886857

The calculation starts at xt=5 and $T_{cor}$=$KT_{(1)}$ with each subsequent calculation being made for xt−1.

The measured density is corrected to 20° C. by the following equation:

$$D_{cor} = ((T_{syr} - 20) \bullet T_{cor}) + D_s \qquad (2b)$$

($D_{cor}$=the corrected value of the measured density and $T_{syr}$=the actual temperature of the syrup.)

From this corrected density value ($D_{cor}$), the weight percent sugar or brix of the sugared syrup can be determined by a least squares regression of National Bureau of Standards Table No. 113. This regression equation is as follows:

$$DN_{act} = DN_{act} + KD_{(xd+1)} \bullet D_{cor}^{xd} \qquad (2d)$$

($DN_{act}$=the actual syrup drink number (true brix) for the specific syrup; KD=a constant corresponding to the least squares regression; and xd=the coefficient value within the regression). The regression for this equation includes the following constant (KD) values for the density to brix conversion:
$KD_{(1)}$=−241.5639
$KD_{(2)}$=183.5383
$KD_{(3)}$=−16.72519
$KD_{(4)}$=289.5726
$KD_{(5)}$=−293.833
$KD_{(6)}$=79.9125

The calculation starts with $DN_{act}$=$KD_{(1)}$ and xd=5 with each subsequent calculation being made for xd−1.

Typically, a correction factor is used by bottlers for the individual syrup formulas to correct the true brix value after the solution is diluted to the ideal ratio for the drink output. This correction factor can be included into the actual calculations as follows:

$$DN_{std} = DN_{act}/SYR \qquad (2d)$$

(SYR=the syrup correction factor variable input by bottler to reference ideal ratio of the syrup.) From this point the standard drink number ($DN_{std}$) can be input into the original equation (2) so as to continuously calculate the density of the syrup and the corresponding volumetric flow rate of the syrup via equation (3).

In the above equations, the density input from the syrup flow meter 60 may need to be calibrated into the normal range of the syrup. Typically, Coriolis mass flow meters are calibrated in a set range with the intent of substantial accuracy over the range. This permits the meters to be applied to a number of applications. In the present application, the ranges for the sugared syrup and the sugar-free syrup are typically much narrower than the broad range of the meter. It has been determined that the linearization of the range for these liquids, if calibrated, can lead to further accuracy in the resulting calculations and, thus, the blending process.

One possible way of calibrating the density readings ($D_s$) for use in the above equations is to input a density zeroing factor and a density span correction factor. These factors are input by the bottler and are determined based upon the analyzation of the syrup prior to blending. Once the true brix of the syrup is known, a back calculation can be performed to determine these density factors.

The correction of the density readout from the meter 60 can be performed by the following equations:

$$SCF = 1 - D_{span} \qquad (2e)$$

(SCF=a span correction factor to linearize the accuracy range of the density readings from the meter and $D_{span}$= input density span multiplier factor to effectuate linearization.)

Once the span correction factor is determined, the raw measured density can be corrected as follows:

$$DS_{cor} = ((D_s + D_{zero}) \bullet D_{span}) + SCF \qquad (2f)$$

($DS_{cor}$=corrected density reading and $D_{zero}$=density zero factor.)

The calculated corrected density ($DS_{cor}$) is then input at the appropriate position in the above equations for the density of the syrup (sugared or sugar-free).

In the same manner as discussed above, the output of water flow meter 54 can be used to calculate the volumetric flow rate as a function of its mass flow and its density flow rate.

Figure 6:
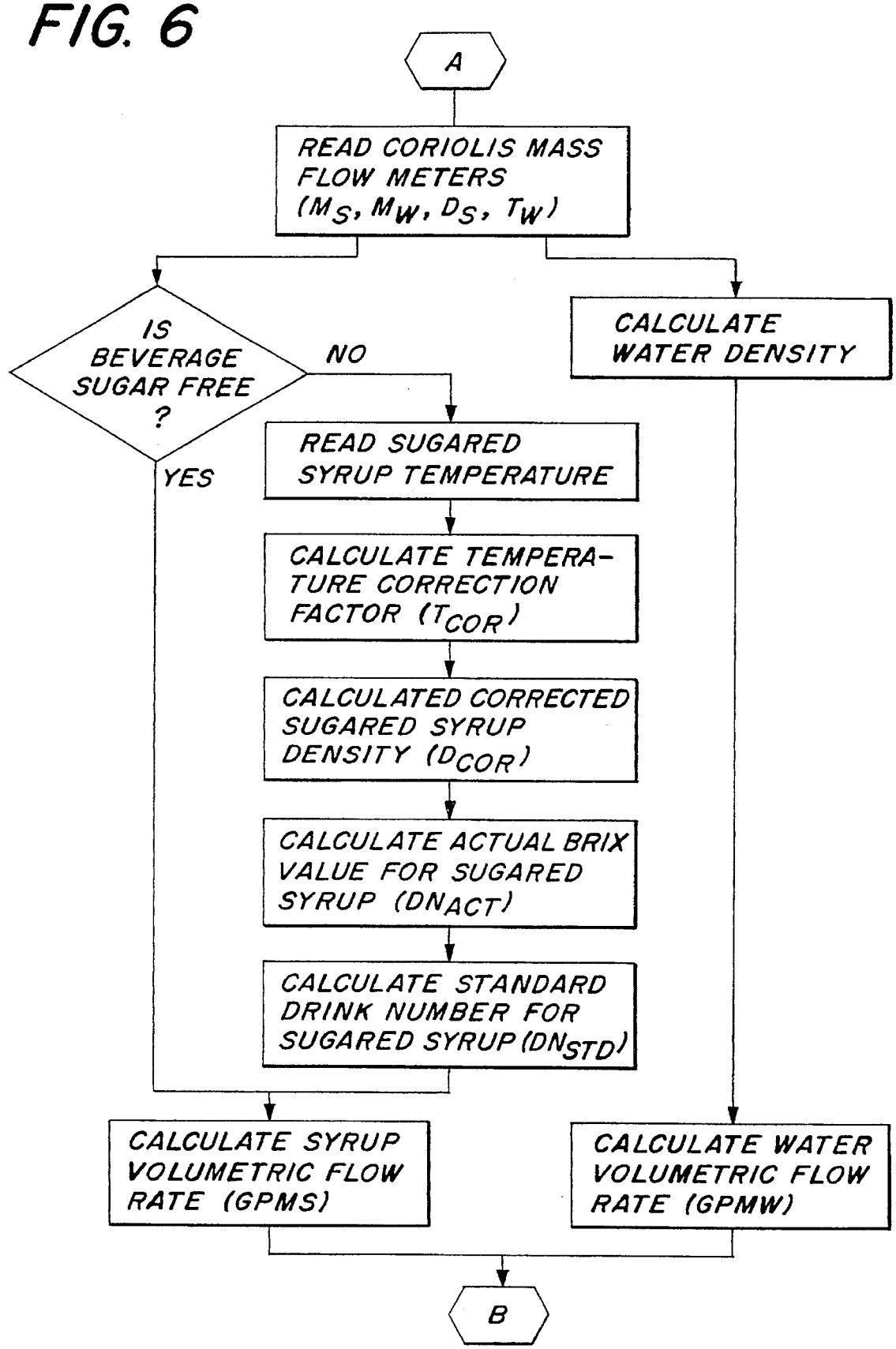

Illustrated in FIG. 6 is a further alternative where the density of the water ($D_w$) can be calculated rather than by using the density value from the meter 54. This alternate calculation uses the temperature of the water to compensate for the variation in density. This corrected water density can be determined using the following formula:

$$DW_{cor} = DW_{cor} + KW_{(xw+1)} \bullet T_w^{xw} \qquad (4a)$$

($DW_{cor}$=density of water as corrected for temperature; KW=a water density constant for the calculations; xw=a coefficient for the calculations; and $T_w$=the temperature of the water in degrees centigrade.) The calculation using this equation includes the following constant (KW) values:
$KW_{(1)}$=0.999879525454374
$KW_{(2)}$=6.21535766300944$\bullet 10^{-5}$
$KW_{(3)}$=−8.39532545382768$\bullet 10^{-6}$
$KW_{(4)}$=6.66817833841402$\bullet 10^{-8}$
$KW_{(5)}$=−4.21500688798692$\bullet 10^{-10}$
$KW_{(6)}$=1.17072870510862$\bullet 10^{-12}$ The series of calculations start at xw=5 and $DW_{cor}$=$KW_{(1)}$ with each subsequent calculation being made at xw−1.

This corrected water density value ($DW_{cor}$) can then be used in equation (4) for the water density number ($D_w$).

As has been discussed above, in the determination of the volumetric water flow rate (GPMW) the final value can be estimated without reference to the mass of that flow. This would include taking a volumetric reading for the water flow through line 52 by an apparatus located at position 54. Thus apparatus 54 could be an alternate type meter from the Coriolis type meter. Since the density of the water will likely not vary significantly over time, this resulting drop in accuracy would not result in an accuracy loss for the final blend.

The result of each of these methods is to provide a volumetric flow rate. As particularly shown in FIGS. 3A and 3B, from this data a calculated ratio for the beverage being blended within blending tank 80 may be determined as well as other aspects of the blending process.

The ratio of the blend is determined by the following equation:

$$RATIO = GPMW/GPMS \tag{5}$$

(RATIO=calculated ratio of water to syrup in blend at time of measurement; and GPMS=either the calculated volumetric flow of the sugar-free ($GPMS_{sf}$) or the sugared ($GPMS_{su}$) syrup.)

The blending of a particular beverage is typically determined as a function of its target drink number. This target drink number is the proper brix value for the sugar in the blended beverage as set by the beverage recipe owner. The bottler must conform to this fixed value in preparing the beverage. However, in preparing each batch of syrup (prior to blending), the "standard" drink number ($DN_{std}$) for the syrup batch may not conform to the target value. A standard drink number for the batch is determined by the bottler through lab analysis by mixing the syrup with water in the exact proportion desired by the beverage owner at a controlled 20° C. The standard and target drink numbers are typically part of the data read by the controller 68 from stored memory at the start of the batch. The difference between the target drink number and the standard drink number for the batch of syrup provides the bottler with an indication of the original setting of the micrometer in order to produce a beverage in conformance with the target value.

Adjustments to the blend during operation of the proportioner require a determination of the drink number for the beverage at the time of the adjustment. This actual drink number can be calculated as a function of the standard drink number for the syrup batch and the ideal blend ratio for the particular beverage:

$$DN_{cal} = ((R_i/RATIO) \bullet DN_{std}) + B_{off} \tag{6}$$

($DN_{cal}$=calculated actual drink number for the batch of blended product and $B_{off}$=adjustment value.) The offset adjustment value may be set by a bottler or by the beverage recipe owner in order to adjust the equation in view of past calculations to arrive at the target. This value may typically be equal to zero (0).

The drink number can be linearized as part of the standard drink number calculation. This preferred variation of the standard drink number calculation is made by the following equation:

$$DN_{cal} = ((Log(R_i)/Log(RATIO)) \bullet DN_{std}) + B_{off} \tag{6a}$$

The same equation can be used to calculate the drink number for the sugar-free drink. However, the standard control drink number ($DN_{std}$) input by the operator is used rather than the calculated standard drink of equation (2d) above.

The bottler is typically permitted by a beverage recipe owner to produce the beverage within a certain percentage range of the target, such as between 100% and 102% of the target drink number. Due to the accuracy of the present invention in determining the actual drink number and controlling the blend, a bottler may identify a set point within this target range. This set point will likely be the lowest possible consistently obtainable value in the target range.

For informational purposes, the calculated drink number ($DN_{cal}$) may be compared to the target and set points by the following equations:

$$TGT_\% = (DN_{cal}/TGT) \bullet 100 \tag{7}$$

$$SET_\% = (DN_{cal}/SET) \bullet 100 \tag{8}$$

($TGT_\%$=percentage of the calculated drink number to the targeted drink number; TGT=the target drink number; $SET_\%$=percentage of the calculated drink number to the set point value; and SET=the set point for a particular bottler.) From these percentage values a determination can be made as to whether of or not an adjustment of the blend is required. Adjustment will be discussed in further detail below.

The volumetric flow rate determinations of equations (1), (3) and (4) may be used to calculate the total flow rate out of the proportioner 50 by the following equation $$GPM_{tot} = GPMS + GPMW \tag{9}$$

Further, the total flow for the particular batch at any particular time can be determined from the total mass flow signal received from the flow meters 54, 60:

$$FLOW_{tot} = MS_{tot}/(8.333 \bullet D_s) + MW_{tot}/(8.333 \bullet D_w) \tag{9a}$$

($MS_{tot}$=the total mass of the syrup; $MW_{tot}$=the total mass of the water; $D_s$=the density of the syrup—$D_{sf}$ for sugar-free syrup or $D_{su}$ for sugared syrup; and $D_w$=the density of the water as either calculated or determined.)

The overall operation of the system may further be controlled by connection to various operating equipment. Such an alternate control would include a reference to the desired total flow through the system in producing a desired product. Thus, by knowing the desired total flow of a blended beverage or the amount of syrup available for blending, the blending rate can be adjusted by controller 68.

Whether or not the drink is sugared or non-sugared, if the syrup total flow ($SYR_{tot}$) is a known, the controller 68 can calculate the water flow total ($WATER_{tot}$) required for a properly blended beverage. The first step in this calculation is to determine a flow factor by the following equation:

$$FLOW_{fac} = R_i^{(DNstd/SET)} \tag{10}$$

($FLOW_{fac}$=flow factor variable; $R_i$=ideal ratio of the drink; $DN_{act}$=actual drink number as calculated by the equations above (i.e., $DN_{std}$ from equation (2d); $DN_{cal}$ from equations (6) or (6a)) or as input by the operator or from a data source; and SET=the set point identified by a particular bottler.)

After the flow factor is calculated, the required total volumetric flow of blended beverage can be calculated using the following equation:

$$FLOW_{tot}=FLOW_{syr}/(1-(FLOW_{fac}/(FLOW_{fac}+1))) \quad (11)$$

($FLOW_{tot}$=total volumetric flow of the blended beverage and $FLOW_{syr}$=total known flow of the syrup.)

This known syrup flow and calculated total flow is translated into a water flow requirement as follows:

$$FLOW_{water}=FLOW_{tot}-FLOW_{syr} \quad (12)$$

If the critical value for the bottler is a desired total output, the total volumetric flow ($FLOW_{tot}$) may be input and the flow factor ($FLOW_{fac}$) of equation (10) above can be used to determine the required water flow and syrup flow as follows:

$$FLOW_{water}=FLOW_{tot}(FLOW_{fac}/(FLOW_{fac}+1)) \quad (11a)$$

$$FLOW_{syr}=FLOW_{tot}-FLOW_{water} \quad (12a)$$

Based upon these calculations, appropriate adjustments of valves 90 or 92 can be made to the input flow into the proportioner 50.

A still further method of determining the true syrup brix within sugared drinks and for controlling the operation of the proportioner 50 results from the conversion of the syrup brix to a weight value. The following is an alternate calculation of the brix value for the blended beverage as originally calculated herein in equations (6) and (6a).

True syrup brix is converted to weight by the following equation for use with a least squares-regression:

$$SYR_{weight}=SYR_{weight}+(KB_{(xb+1)} \bullet DN_{act}^{xb}) \quad (13)$$

($SYR_{weight}$=syrup weight of the syrup as a function of its brix content; KB=syrup weight constant within least squares regression; xb=the least squares coefficient; and $DN_{act}$=is the actual brix value for the syrup taken from equation 2(c).)
The following constants are used with this equation for purposes of the calculation:
$KB_{(1)}$=2.28692647923650$10^{-5}$
$KB_{(2)}$=8.320311527396680$10^{-2}$
$KB_{(3)}$=3.238053325890610$10^{-4}$
$KB_{(4)}$=9.929189820711820$10^{-7}$
$KB_{(5)}$=6.520890076550260$10^{-9}$
$KB_{(6)}$=-2.610234897175070$10^{-11}$
The series of calculations start at xb=5 and $SYR_{weight}$=$KB_{(1)}$ with each subsequent calculation being made at xb-1.

Based upon the calculation of the syrup weight factor ($SYR_{weight}$), the weight of the product can be determined using the measured flow values for the syrup and water from the meters 54 and 60. This determination is made by the following equation:

$$PROD_{weight}=SYR_{weight}/(RATIO+1) \quad (14)$$

($PROD_{weight}$=weight of the actual product blended and RATIO=weight ratio which is proportional to the measured water volumetric flow over the measured syrup volumetric flow as taken from equation (5) above.)

The calculated product weight is converted to an actual brix (drink number) value of the product by the following equation:

$$BRIX_{prod}=BRIX_{prod}+(KP_{(xp+1)} \bullet PROD_{weight}^{xp}) \quad (15)$$

($BRIX_{prod}$=the true product brix for the blended beverage; KP=brix constant within least squares regression; and xp=the least squares coefficient.) The following constants are used with this equation for purposes of the calculation:
$KP_{(1)}$=2.17092613563310$10^{-3}$
$KP_{(2)}$=12.0074543360048
$KP_{(3)}$=-0.549309235817398
$KP_{(4)}$=2.514327588147390$10^{-2}$
$KP_{(5)}$=3.024545373913230$10^{-4}$
$KP_{(6)}$=1.270454498508440$10^{-5}$
The series of calculations start at xp=5 and $BRIX_{prod}$=$KP_{(1)}$ with each subsequent calculation being made at xp-1.

In addition, the product weight ($PROD_{weight}$) can be converted to refractometer brix. This calculation will be used by those who use a refractometer type analyzer downstream, or otherwise, in the system. The refractometer brix can be calculated by the following equation:

$$BRIX_{ref}=BRIX_{ref}+(KR_{(xr+1)} \bullet PROD_{weight}^{xr}) \quad (16)$$

($BRIX_{ref}$=the calculated value for refractometer brix; KR=refractometer BRIX constant within the least squares regression; and xr=the least squares coefficient.) The following constants are used with this equation for purposes of the calculation:
$KR_{(1)}$=-3.382968317589130$10^{-3}$
$KR_{(2)}$=11.9633309420215
$KR_{(3)}$=-0.700804638181923
$KR_{(4)}$=0.161526501455724
$KR_{(5)}$=-5.184578109288220$10^{-2}$
$KR_{(6)}$=7.110402342583970$10^{-3}$
The series of calculations start at xr=5 and $BRIX_{ref}$=$KR_{(1)}$ with each subsequent calculation being made at xr-1.

This calculation of the refractometer brix ($BRIX_{ref}$) is for convenience of the bottler, since it is a common reference point. However, the syrup recipe owner may not require accuracy from the bottler by reference to this value. It has been experimentally identified that the calculated value may require calibration in order to operate in the normal range of the readings provided for titrated acidity of the sugar-free syrup. The calibration of the calculated refractometer brix can be performed by the following equation:

$$BRIX_{Radj}=BRIX_{ref}-(TA_{target} \bullet 0.004) \quad (16a)$$

($BRIX_{Radj}$=refractometer brix as calibrated and $TA_{target}$=the input value for a target titrated acidity from initial measurements on the syrup.)

If the set point (SET) is entered in refractometer brix, the following equation converts the set point to weight:

$$SET_{weight}=SET_{weight}+(KS_{(xs+1)} \bullet SET^{xs}) \quad (17)$$

($SET_{weight}$=the set point weight value as calculated from refractometer brix set value; KS=set point weight constant within the least squares regression; and xs=the least squares coefficient.) The following constants are used within this equation for purposes of the calculation:
$KS_{(1)}$=2.883509801377680$10^{-4}$
$KS_{(2)}$=8.357997504228550$10^{-2}$
$KS_{(3)}$=4.149439412517770$10^{-4}$
$KS_{(4)}$=-4.989366158937060$10^{-6}$
$KS_{(5)}$=1.685014792791620$10^{-7}$
$KS_{(6)}$=-1.391936113777620$10^{-9}$
These series of calculations start at xs=5 and $SET_{weight}$=$SK_{(1)}$ with each subsequent calculation being made at xs-1.

If the set point is entered in true brix, the same equation can be used, however using different coefficients (KS), to convert the set point to weight. These coefficients are as follows:

$KS_{(1)}=2.28692647923650 \cdot 10^{-5}$
$KS_{(2)}=8.32311527396680 \cdot 10^{-2}$
$KS_{(3)}=3.238053325890610 \cdot 10^{-4}$
$KS_{(4)}=9.929189820711820 \cdot 10^{-7}$
$KS_{(5)}=6.520890076550260 \cdot 10^{-9}$
$KS_{(6)}=-2.610234897175070 \cdot 10^{-11}$ The same series of calculations start with xs=5 and $SET_{weight}=KS_{(1)}$ with each subsequent calculation being made at xs−1.

Using this information, the required ratio and required water flow rate can be determined. The equations utilized will be dependent on whether or not a single control element such as actuator 70 and valve 72 are used or whether dual actuators and valves are utilized (including actuator 70 and second micrometer valve 76). For a single element control the following equations apply:

$$RATIO_{req}=(SYR_{weight}/SET_{weight})-1 \qquad (18)$$

$$FLOW_{water}=FLOW_{syr} \bullet RATIO_{req} \qquad (19)$$

In using the dual control element, the total flow is entered by the system operator. Thereafter, the set point is defined above in the single element control formulation using the equation (19). Thereafter, the following relationships are defined:

$$FLOW_{Sreq}=FLOW_{tot}/RATIO_{req} \qquad (20)$$

$$FLOW_{Wreq}=FLOW_{tot}-FLOW_{Sreq} \qquad (21)$$

($FLOW_{tot}$=the total flow for the beverage as input by the bottler to achieve a desired blend rate.)

Based upon these values, the micrometer control 72 and/or 76 can be adjusted to vary the water and syrup flow to create a proper blend in the carbonator 84. Variation of the micrometer controls.

From the calculated values, a determination can be made of the adjustment required by the valve 72 and/or 76 in order for the proportioner 50 to blend the beverage in line with the set point of the bottler. The first determination is the variation of the calculated drink number from the set point:

$$ERROR=DN_{cal}-SET \qquad (22)$$

If the alternate weight calculations were performed, equation (22) would be written as follows:

$$ERROR=BRIX_{prod}-SET \qquad (22a)$$

If there is an variation between these two values, an adjustment is required. From the error value a control signal may be directed to actuator 70 and/or 71 for appropriate adjustment of the micrometer valve 72 and/or 76, respectively, to bring the blended beverage into line with the set point and, thus, the recipe owner's target. This adjustment may be determined by the following equation:

$$M_{adj}=((ERROR \cdot GAIN)+(ERROR \bullet T_E/T_K))/100 \qquad (23)$$

(GAIN=a multiplication factor for the ERROR signal; $T_K$=an integral time constant in repeats per minute; and $T_E$=the elapsed time from the last adjustment.) The value for the integral time constant is discretionary and is contemplated to be set as part of the programming of controller 68, rather than being set by the bottler. Therefore, this value would not be changed after installation.

As can be seen from these equations, a calculated drink number for the beverage ($DN_{cal}$ or $BRIX_{prod}$) which is greater than the set point (SET) will result in a positive error (ERROR) signal. This positive error will be converted into a positive value for the adjustment ($M_{adj}$) of valve 72 and/or 76. This positive value will increase the amount of water within the blend and decrease the resulting drink number (e.g., for a sugared beverage, reduces the brix value for the sugar in the blended beverage). Thus, the next calculation made for the error (ERROR) signal will be decreased. If this newly calculated drink number is not equal to the set point and, thus, the error signal is not equal to zero, the micrometer will be adjusted again. A calculated drink number that is less than the set point will approach a zero error value in the same manner, but from the opposite direction.

The micrometer adjustment calculation of equation (23) would produce a change in the setting of the valve 72. The setting value for a micrometer-type valve is typically expressed in mils over the total length of the valve movement. A calibration factor may be required to direct the actuator 70 to adjust the micrometer within the proper proportions. Further, a different calibration may be required to provide a readout of the mil position of the micrometer in the bottler's normal units.

Upon initial start-up of the system, the bottler would manually or through the controller 68 open the valves 72, 76 to a recommended value for the drink specification. Thereafter, it is also possible to manually adjust this valve for any additional changes other than those made by the actuators 70, 71 in response to the control signals from controller 68. The most common error (ERROR) will be the result of the start-up position of the valves 72, 76. The setting at start-up is typically an estimate. Once the blended beverage has been adjusted to the target range, the only changes that would be required to maintain the blend within that range and at the set point would be initiated by the actuators 70, 71 via the calculations and control signals of controller 68.

The adjustment by controller 68 preferably includes a range limit. This range would prevent the controller from adjusting the valves 72, 76 at too great a variation without further authorization from the bottler. It is contemplated that a plus or minus 2% variation in the micrometer setting would be a sufficient limit for this purpose. If a greater value were calculated by the controller 68, such may be the result of an unusual error within the system. An audible alarm would then initiate a warning to the bottler that a significant change has occurred within the system. The bottler will be required to cancel the calculated result or approve the change and initiate a new 2% control limit. This scheme ensures a quality control with limitations. This will confirm that the variations are a normal fluctuation within the system rather than a miscalculation or unusual error. If the user does not agree with the value change, the product will not deviate off specification without further proof that such is required.

Another form of adjustment of the blend can be performed through the specific use of a second actuator mechanism 71 connected to the micrometer valve 76 on the syrup flow portion of proportioner 50. Using this equipment, the controller 68 can perform a standard two mode control calculation for the water and syrup flows in a manner such as that described below.

The first step is to determine a proportion factor as a result of the error in the flow within the system. For illustration purposes the water proportion factor will be described first as follows:

$$PROP = (FLOW_{water} - FLOW_{Wact}) \bullet GAIN \quad (24)$$

(PROP=a proportion factor for the instantaneous error correction; $FLOW_{water}$=desired volumetric flow of the water calculated as a result of equation (12) above; $FLOW_{Wact}$= actual volumetric flow rate of the water measured and calculated at that time; and GAIN=a user entered response factor for purposes of making the proportion factor work through the control valve 72 at a desired rate.)

Using this proportional factor, the amount of adjustment is controlled as follows:

$$REPEAT = TIME \bullet RESET \bullet PROP \quad (25)$$

(REPEAT=calculated value to bring the flow error down toward the desired rate; TIME=value of time between successive calculations; and RESET=user input to control the number of repeats per minute of correction to the water output line 74 via actuator 70 and valve 72.)

Using the repeat factor, the output to the actuator 70 can be defined by the following equation:

$$MPUT_{water} = MPUT_{water} + PROP + REPEAT \quad (26)$$

($MPUT_{water}$=a correction factor for control of valve which corrects the original setting of valve to reach the desired setting and a zero error in flow.)

Using appropriate logic, further variables in the adjustment of the actuator 70 can be define by the following:

If $MPUT_{water} + FLOAT_1 > 99.9$;

Then $MPUT_{water} = 99.9 - FLOAT_1 - 0.1$ (27)

If $MPUT_{water} + FLOAT_1 < 0.1$;

Then $MPUT_{water} = 0.0 - FLOAT_1 0.1$ (28)

($FLOAT_1$ and $FLOAT_2$=preset positions for valves 72, 76 or the like at start up.) These equations (27) and (28) are used to keep the system from moving over 100% of the desired flow and thereafter continuing away ("winding up") from that desired value without moving in on the desired flow rate. Based upon these calculations, an output signal is calculated to adjust the setting of the valve:

$$OUTPUT_{water} = MPUT_{water} + FLOAT_1 \quad (29)$$

The water output signal ($OUTPUT_{water}$) as calculated is in percent and is converted to a 4 to 20 milliamp signal to the actuator 70. Alternatively, the actuator 70 could be replaced along with the micrometer valve 72 such that the milliamp signal is converted into a 3 to 15 psig signal that controls a mechanical valve device 90 at the input line to the proportioner 50. These calculations are then repeated with all variables being up dated (except $FLOAT_1$ and $FLOAT_2$), i.e., the controller returns to equation (24).

Similarly, actuator 71 can be used to control the flow through the syrup output leg 78 of proportioner 50 via its connection to valve 76. These equations are as follows:

$$PROP = (FLOW_{syr} - FLOW_{Sact}) \bullet GAIN \quad (24a)$$

$$REPEAT = TIME \bullet RESET \bullet PROP \quad (25a)$$

$$MPUT_{syr} = MPUT_{syr} + PROP + REPEAT \quad (26a)$$

If $MPUT_{syr} + FLOAT_2 > 99.9$;

Then $MPUT_{syr} = 99.9 - Float_2 - 0.1$ (27a)

If $MPUT_{syr} + FLOAT_2 < 0.1$;

Then $MPUT_{syr} = 0.0 - Float_2 + 0.1$ (28a)

$$OUTPUT_{syr} = MPUT_{syr} + FLOAT_2 \quad (29a)$$

The syrup output signal can be similarly applied to the actuator 71 and valve 76 on syrup output line 78 or applied to valve 92 at the input side.

The total volumetric flow determination ($FLOW_{tot}$) can be used to predict the number of cases which should be produced by a particular run.

$$CASE_{proj} = (FLOW_{tot} \bullet 128)/CONT_{vol}/CASE_{size} \quad (30)$$

($CONT_{vol}$=the volume in each particular container and $CASE_{size}$=the number of containers to be input into a case.)

The controller 68 may be set to receive a pulse signal for each bottle or container passing through the bottling apparatus. From this pulse count, the actual total number of cases produced is determined by the following equation:

$$CASE_{tot} = P/CASE_{size} \quad (31)$$

(P=the number of pulses received from the bottler.)

An efficiency estimate may be made by using the volumetric calculations for the projected case total and comparing this value to the actual number of cases which have been produced:

$$CASE_{lost} = CASE_{proj} - CASE_{tot} \quad (32)$$

Also, an efficiency determination for the entire system can be made by evaluating the run time and the maximum obtainable cases per minute. This efficiency calculation is as follows:

$$EFF = ((P/T_{run})/CPM) \bullet 100 \quad (33)$$

($T_{run}$=the time of the batch run and CPM=the determined maximum cases per minute value seen during the particular batch run.) The maximum cases per minute during the run and the comparison to the overall output of the run are values which are usually desired by the bottler.

All values calculated can be displayed on a screen for observation during the run. These calculated values can be averaged over a number of cycles by the controller 68 and may also be displayed as a function of the average over a specific period of time such as 1 minute. The time averages can also be charted on a graph and displayed accordingly.

Another variable in the blending of a beverage is the solubility of the $CO_2$ input into the beverage by the carbonator 84. This variable is determined as a function of the temperature and pressure within the carbonator 84. The temperature is determined preferably by a electronic temperature sensor 96. The pressure in the carbonator 84 is preferably determined by an electronic pressure sensor 94. These sensors 94 and 96 report the appropriate data to the controller 68 for purposes further processing. The controller then uses published curves for these determinations as produced by the American Bottling Association in conjunction with these variables to determine the volumes of $CO_2$ within the beverage.

A least squares method may again be utilized to calculate the temperature factor of the carbonation as a function of the changing conditions in carbonator 84. The least squares regression for this temperature component is as follows:

$$T_{co2}=T_{co2}+KC_{(xc+1)} \bullet T_{carb}{}^{xc} \qquad (34)$$

($T_{co2}$=the temperature coefficient for carbonator; KC=the coefficient value within the calculation; xc=the position within the regression; and $T_{carb}$=the temperature in °F. in the carbonator.) The constants within this regression are as follows:
$KC_{(1)}$=0.3529254
$KC_{(2)}$=0.008671118
$KC_{(3)}$=-0.000007131652
$KC_{(4)}$=0.000002720279
$KC_{(5)}$=-0.00000003849611
$KC_{(6)}$=0.000000000177644
The calculation starts at xc=5 and $T_{co2}=KC_{(1)}$ with each subsequent calculation being made for xc−1.

Another factor which should be determined prior to calculating the volumes of $CO_2$ added to the beverage. This factor is a result of the pressure in the carbonator 84 and can be determined by the following equation:

$$P_{fac}=(P_{co2}/13.7)+1.075 \qquad (35)$$

($P_{co2}$=the pressure within the carbonator system.) The constant values within this equation (35) have been determined from the same published sources of the American Bottling Association as for equation (34).

From the determination of the temperature coefficient and the pressure factor in the carbonator 84, the volumes percent of carbonation can be determined as follows:

$$VOL_{co2}=(P_{fac}/T_{co2})+C_{off} \qquad (36)$$

($C_{off}$=offset adjustment value.)

As an alternative to the additive offset value, the above equation can be rewritten with a multiplier as follows:

$$VOL_{co2}=(P_{fac}/T_{co2}) \bullet C_{off} \qquad (37)$$

Based upon experimentation and experience, the normal carbonator system will saturate only to 80% of total saturation. Thus, a typical value for $C_{off}$ in the above equation would be approximately 0.8.

Carbonator systems often inject a flow of $CO_2$ to assist in the flow of the blend during carbonation. This injected flow of $CO_2$ further saturates within the blended beverage and may be required to be accounted for in the final product. Based upon past experience and the fact that this injected flow is typically fully absorbed into the liquid, the injected volume of $CO_2$ can be calculated as follows:

$$GASVOL_{inject}=GAS_{cfpm}/LIQUID_{cfpm} \qquad (38)$$

($GASVOL_{inject}$=volume of gas dissolved in the liquid due to injected flow; $GAS_{cfpm}$=the standard cubic feet per minute of gas flow; and $LIQUID_{cfpm}$=the standard cubic feet per minute of blended beverage from the proportioner 50.)

This injected flow value can be added to the static volumes of $CO_2$ introduced by the carbonator to provide an actual volumes of $CO_2$ result as follows:

$$GASVOL_{act}=GASVOL_{co2}+GASVOL_{inject} \qquad (39)$$

Typically, the volumes of $CO_2$ is determined by a shake test outside of the carbonator. The present calculations are being performed in line. Therefore, the readings made by in line sensors may not provide an accurate value. This determination may be adjusted ($C_{off}$) to provide a value that is within the desired specifications of the bottler. The offset value is provided so as to account for the standard variations in the calculation from the normal mode of testing.

In order to control the amount of gas introduced into the system an alternate carbonator structure has been developed. This carbonator structure 84' is detailed in FIG. 7.

Figure 7:
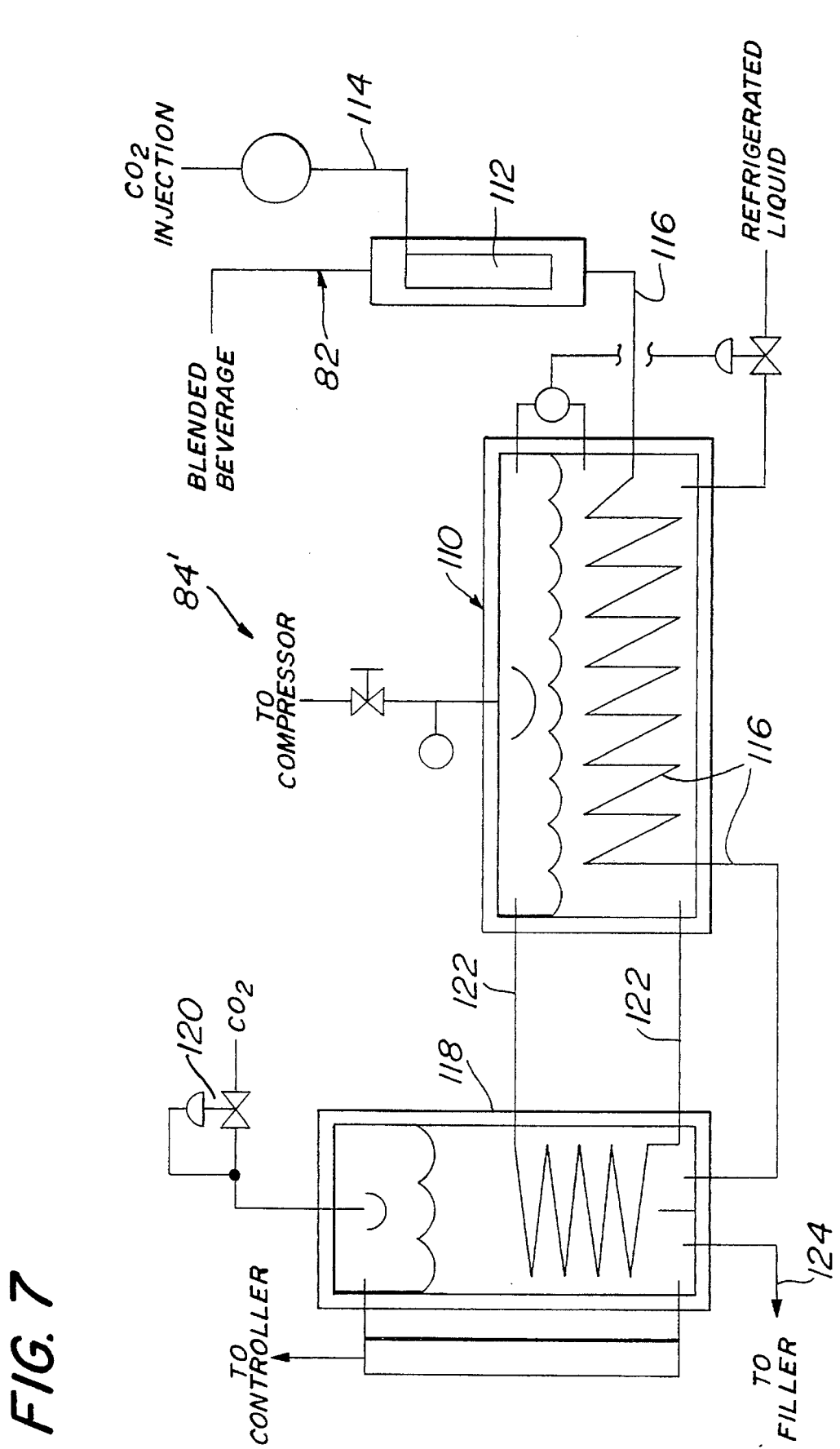
FIG. 7 shows one form of a carbonator for use with the blending apparatus as contemplated by the present invention.

As is illustrated in FIG. 7, the flow of blended beverage from the proportioner 50 is fed through line 82 into diffuser 112. A flow of $CO_2$ is injected into the diffuser 112 through inlet 114. It is preferred that, at least, the $CO_2$ flow be controlled through a Coriolis mass flow meter for purposes of accuracy. Moreover, if the Coriolis meters 54 and/or 60 of the system shown in FIG. 2 or discussed herein are not used in conjunction with the carbonator 84', it is also preferred that the flow of blended beverage from line 82 be controlled by a similar Coriolis meter.

The combined flow of the beverage and gas mixture from the diffuser 112 is feed through pipeline 116, preferably made of stainless steel, into a heat exchanger 110. The exchanger 110 is filled with a refrigerated liquid, preferably ammonia, which surrounds the coiled tubing of pipeline 116. By controlling the temperature and pressure of the flow through exchanger 110, 100% of the gas will be dissolved in the liquid beverage. The pipeline 116 within the heat exchanger 110 is coiled such that the flow therein is centrifugally forced to the outside walls of the tubing while pockets of undissolved gas remain on the inside walls. This relative relationship of the liquid and the undissolved gas acts to thin the liquid and increase the surface area of exposure of the liquid to the undissolved gas.

Since the velocity of the liquid, the amount of gas to be dissolved and the temperature and pressure of the mixture are all variables, it can be difficult to account for all flow circumstances so as to consistently achieve 100% dissolved gas flow. Therefore, it has been found that an over design of the coiled tubing 116 within the exchanger 110 can result in the full absorption of the gas into the liquid.

The over design is used because the structure must be able to accommodate a number of variables within the flow system over its life. In prototype, it was determined empirically that a beverage flow of 20 feet per second at approximately 3.5 volumes of $CO_2$, a minimum of 75 feet of tubing was required before 100% of the gas was dissolved. It was further determined by measuring the temperatures along the tube, that 90% of the heat exchange should take place in the first 25% of the tube length in order to accomplish this 100% dissolving of the gas. Since engineering standards typically recommend that a certain a percentage be added to ensure the successful operation of the design, it has been determined that by doubling of the length of the tube required for a satisfactory design under controlled conditions will encompasses the numerous variables that may occur outside the empirical data referenced above. This over design is intended to prevent the occurrence of the length of tubing being too short and thus an insufficient amount of gas being dissolved in the liquid. The over design may provide an excessive amount of tubing, however, this accommodates for the possible variation in design principles.

In addition to the over designed heat exchanger 110, a back pressure is applied to the flow through the pipeline 116. As illustrated, the pipeline 116 exits the exchanger 110 and introduces the liquid/gas combination into an insulated vessel 118. The pressure in the vessel 118 is maintained, preferably, by a 40 psig blanket of $CO_2$ which enters the vessel through valve 120 and by a level control for the liquid in the vessel (not shown). In addition, the temperature of the liquid in the reservoir of vessel 118 is maintained by a flow of the liquid refrigerant from heat exchanger 110 through tubing 122. Turbulence in the vessel 118 is minimized by positioning the inflow of the liquid from pipeline 116 at the bottom of the vessel. The outflow through line 124 is also positioned at the bottom of the vessel 118 and directs the flow to a filling machine (not shown). The vessel 118 is preferably tall as compared to wide, having a diameter of 12 inches or less, and holding approximately 100 gallons of liquid. This dimensional relationship will reduce turbulence and also reduce the surface area of the liquid. Thus, the surface area in contact with gas from the $CO_2$ blanket will be minimized as will its further absorption into the liquid. A floating plate (not shown) may also be used to reduce turbulence and the amount of absorption of the $CO_2$ blanket.

Illustrated in FIG. 8 is a further alternate version of the carbonator 84". This alternate carbonator 84" includes a variation in the heat exchanger 110' as compare to that shown in FIG. 7.

In FIG. 8, the combined flow of blended beverage and gas from the diffuser 112 is feed through a heat exchanger 110' prior to passing through the coiled pipeline 116. Thus, the temperature of the combined flow of beverage and gas is lowered prior to the centrifugal movement of the flow through the pipeline 116. The specific heat exchanger' shown in FIG. 8 is contemplated to be a tubular exchanger such as that manufactured by Kemp Refrigeration of Chatham, Ill. This exchanger is intended to lower the temperature of the flow at the input of the coiled tubing 116 to acceptable levels for the desired dissolution of $CO_2$ into the mixture. Of course other variations in the design of the exchanger 110' are possible and contemplated.

The carbonator 84" as shown in FIG. 8, as compared to that shown in FIG. 7, is acceptable since it has been determined that the temperature of the combined flow through the tubing will remain sufficiently constant through the coiled tubing 116 without the requirements of the ammonia bath. Furthermore, it has been determined that when a cold flow of water is used to create the blended beverage prior to its input into the diffuser 112, the exchanger 110 may be eliminated from the carbonator 84' or 84". Also, depending on the ambient operating conditions, the exchanger 110 or 110' may be operated on a selective basis, such as only when the temperature of the combined flow is not within the desired temperature range. The primary need for reducing the temperature of the fluid flow is the bottler or filler operation. Thus, it is possible to move the heat exchanger, if required, to almost any position within the blending or carbonation system.

Using the structures shown in either FIGS. 7 or 8, it has been determined that 20 seconds of contact is desired between the gas from injector 114 and the flow of blended beverage. This preferred contact time may be created by a flow of 125 gallons per minute through 240 feet (linear length) of standard tubing (wall thickness of 0.065 inches) having an outside diameter of 2 inches. In this construction, the outside diameter of the coil of the tubing 116 is preferably 48 inches. This construction results in a pressure drop of approximately 30 psig across the tubing 116. It should be noted, however, that the coil diameter could be smaller, if heavier wall thicknesses were utilized. Also, it may be possible that improved performance would be created by a greater pressure drop and/or a longer contact time between the gas and the blended beverage within the tubing 16. The considerations in this area are the maintenance of sanitary conditions, the weight of the structure, cavitation, safety, etc. In addition, higher flow rates could be incorporated. This would likely require larger tubing. For example, for a desired result of producing approximately the same pressure drop and contact time parameters (as discussed above), a flow rate of 250 gallons per minute would require tubing having an outside diameter of 2½ inches. Again, variations in this structure are possible without departing from the principles of the present invention.

The carbonators 84' and 84" operates using total injection flow (i.e., without static flow as in a typical carbonator). Based upon the of the carbonator 84' or 84" achieving full saturation of the $CO_2$, the following mathematical relationship applies in determining the actual volumes of $CO_2$:

$$GASVOL_{dissolved} = GAS_{cfpm}/LIQUID_{cfpm} \qquad (40)$$

($GASVOL_{dissolved}$=volume of gas dissolved in the liquid.) This equation is essentially the same as equation (38) above.

An additional element contemplated for use with the present invention is an air/foam removal system 126. Such a system is desirable since the total quantity of air or foam within a liquid flow, if excessive, may have an effect on the operation and accuracy of Coriolis mass flow meters. The system is best located on the suction or inlet side of the pump 128 that feeds the syrup flow meter 60. A stilling tank 130 with a volume great enough for sufficient holding time at the desired flow rates and accounting for the viscosity of the syrup is positioned within the feed line 58. Flow into the pump 128 will be taken from the bottom of the tank 130. A vent 132 is provided at the top of the tank 130. A float 134 is provided in the tank to determine the level of the liquid in the tank 130. It is preferred that the level in the tank 130 be maintained at approximately 90% liquid full. The float 134, therefore, will preferably have a 0.9 specific gravity. The float 134 is connected to an electrical switch 136 which will operate the valve on the vent at the top of the tank. Since the foam and air are gasses which will rise inherently to the top of the tank 130 and would have a specific gravity of less than 0.9, after the gas occupies more than 90% of the tank 130 and the float 134 moves below its set level, the gas will be vented off. An alarm may also be provided to indicate when the float 134 has tripped for an extended length of time. This will indicate either a malfunction or, more typically, a no flow situation for incoming liquid.

The system in accordance with the present invention is contemplated to be highly accurate in controlling the operation of the proportioner and for maintaining the blend within the standards set by the beverage owner. It is contemplated that the present invention can be adapted to existing bottling systems throughout bottlers within the United States. The present invention will incorporate into the existing bottling system a highly accurate means for automatically controlling the proportional blending of the beverage. The ultimate accuracy of the control initiated by the present invention may continue to be determined as a function of an analyzer which is either downstream in the system or which is performed in the lab. However, by the application of the present invention into a new or existing bottling plant, it is contemplated that the need for disposal of already blended beverage which is not made in accordance with the requirements of the recipe owner will be eliminated after achieving a consistent setting for the control valve in the proportioner.

The present invention may be embodied in other specific forms without departing from the spirit or essential attributes thereof and, accordingly, reference should be made to the appended claims, rather than to the foregoing specification, as indicating the scope of the invention.

We claim:

1. A method of blending a beverage comprising the steps of:

(a) measuring the mass flow rate of a first beverage component by a Coriolis mass flow meter;

(b) measuring the mass flow rate of a second beverage component by a Coriolis mass flow meter;

(c) calculating a required flow rate of the first beverage component as a function of the measured mass flow rates of the first and second beverage components and a preset value for the ideal mass flow rates of the first and second beverage;

(d) combining the first and second beverage components to form a beverage flow;

(e) adjusting the flow rate of the first beverage flow component so that the beverage flow conforms to the preset value.

2. A method as in claim 1 further comprising the steps of:

(f) determining the mass flow rate of a flow of $CO_2$;

(g) injecting the flow of $CO_2$ into the beverage flow; and (h) conducting the beverage and $CO_2$ along a conduit so as to dissolve the $CO_2$ into the beverage to produce a mixture.

3. A method as in claim 2 wherein the mass flow rate of the $CO_2$ is determined by a Coriolis mass flow meter.

4. A method of blending a beverage comprising the steps of:

receiving a mass flow rate signal from a mass flow meter for a flow of a first beverage component;

receiving a mass flow rate signal from a mass flow meter for a flow of a second beverage component;

calculating a ratio of the first beverage component mass flow rate signal to the second beverage mass flow rate signal;

comparing the ratio of mass flow rate signals to a preset ratio;

determining an adjustment factor based on the comparison of the ratio of mass flow rate signals to the preset ratio;

adjusting the flow of the first beverage component as a function of the adjustment factor; and combining the first and second component flows to form a beverage flow.

5. A method as in claim 4 further comprising the steps of:

receiving a mass flow rate signal from a mass flow meter for a flow of $CO_2$;

adjusting the flow rate of $CO_2$ by comparing the mass flow rate signal for the $CO_2$ to a predetermined value;

injecting the flow of $CO_2$ into the beverage flow; and conducting the beverage and $CO_2$ along a conduit so as to dissolve the $CO_2$ into the beverage flow to produce a mixture.

6. A method as in claim 5 wherein the mass flow rate signals for the first and second beverage components and for the $CO_2$ are generated by Coriolis mass flow meters.

7. A method of blending a beverage comprising the steps of:

(a) receiving a mass flow rate signal from a mass flow meter for a water flow;

(b) receiving a mass flow rate signal from a mass flow meter for a sugared syrup flow;

(c) determining a temperature of the sugared syrup flow;

(d) calculating the density of the syrup flow as a function of the determined temperature of the sugar syrup flow;

(e) determining an actual brix value for the syrup flow as a function of the calculated density of the syrup;

(f) determining an actual syrup and water flow rate ratio as a function of the mass flow rate signals;

(g) calculating a drink number in accordance with the following formula:

calculated drink number=((ideal syrup and water flow rate ratio/actual syrup and water flow rate ratio)●standard drink number)+an adjustment value, where the standard drink number is a predetermined brix value based on the ideal syrup and water flow rate ratio;

(h) comparing the calculated drink number to a preset target value;

(i) adjusting the flow of the water as a function of the comparison; and (j) combining the water and syrup flows to form a beverage flow.

8. A method of blending a beverage comprising the steps of:

(a) receiving a mass flow rate signal from a mass flow meter for a water flow;

(b) receiving a mass flow rate signal from a mass flow meter for a syrup flow;

(c) determining a temperature of the syrup flow;

(d) calculating the density of the syrup flow as a function of the determined temperature of the syrup flow;

(e) determining an actual brix value for the syrup flow as a function of the calculated density of the syrup;

(f) determining an actual syrup and water flow rate ratio as a function of the mass flow rate signals;

(g) converting the actual brix value to a syrup weight;

(h) calculating a product weight as a function of the syrup weight and the syrup and water flow rate ratio;

(i) calculating a set point weight value as a function of a predetermined set point value;

(j) calculating the required syrup and water flow rate ratio as a function of the set point weight and the syrup weight;

(k) adjusting the flow of water as a function of the flow of syrup and the required flow rate ratio; and (l) combining the water and syrup flows to form a beverage.

9. A method as in claim 8 wherein the converting of the actual brix value to a syrup weight is performed as a function of a set of predetermined standards.

10. A method as in claim 8 wherein the converting of the actual brix value to a syrup weight is performed by a least squares regression according to the following formula $$SYR_{weight}=SYR_{weight}+(KB_{(xb+1)} \bullet DN_{act}{}^{xb})$$

where $SYR_{weight}$ is the syrup weight of the syrup flow as a function of its actual brix content, $DN_{act}$ is the actual brix value for the syrup flow, xb is the least squares coefficient, and KB is the syrup weight constant within least squares regression, where the constants utilized in the formula are approximately $$KB_{(1)}=2.2869264792365 \bullet 10^{-5}$$

$$KB_{(2)}=8.32031152739668 \bullet 10^{-2}$$

$$KB_{(3)}=3.23805332589061 \bullet 10^{-4}$$

$$KB_{(4)}=9.92918982071182 \bullet 10^{-7}$$

$$KB_{(5)}=6.52089007655026 \bullet 10^{-9}$$

$$KB_{(6)}=-2.61023489717507 \bullet 10^{-11},$$

where the conversion starts at xb=5 and $SYR_{weight}=KB_{(1)}$ with each subsequent calculation within the regression being made at xb−1.

11. A method as in claim 8 wherein the calculating of the product weight is according to the following formula $$PROD_{weight}=SYR_{weight}/(RATIO+1)$$

where the $PROD_{weight}$ is the weight of the beverage and the RATIO is the actual syrup and water flow rate ratio.

12. A method as in claim 8 further comprising the step of converting the product weight to an actual brix value for the beverage.

13. A method as in claim 8 further comprising the step of converting the product weight to a refractometer brix value.

* * * * *